(12) United States Patent
Kanazawa et al.

(10) Patent No.: US 9,213,437 B2
(45) Date of Patent: Dec. 15, 2015

(54) TOUCH PANEL CONTROLLER, INTEGRATED CIRCUIT, TOUCH PANEL SYSTEM, AND ELECTRONIC DEVICE

(71) Applicant: SHARP KABUSHIKI KAISHA, Osaka-shi, Osaka (JP)

(72) Inventors: Yusuke Kanazawa, Osaka (JP); Yoshihisa Fujimoto, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/388,287

(22) PCT Filed: Apr. 2, 2013

(86) PCT No.: PCT/JP2013/060115
§ 371 (c)(1),
(2) Date: Sep. 26, 2014

(87) PCT Pub. No.: WO2013/151060
PCT Pub. Date: Oct. 10, 2013

(65) Prior Publication Data
US 2015/0301682 A1    Oct. 22, 2015

(30) Foreign Application Priority Data

Apr. 4, 2012   (JP) .................. 2012-085934

(51) Int. Cl.
*G06F 3/041*   (2006.01)
*G06F 3/044*   (2006.01)

(52) U.S. Cl.
CPC .............. *G06F 3/0418* (2013.01); *G06F 3/044* (2013.01)

(58) Field of Classification Search
CPC ............................. G06F 3/044; G06F 3/0418
USPC ...................... 178/18.01–19.07; 345/173–178
See application file for complete search history.

(56) References Cited

U.S. PATENT DOCUMENTS

2005/0141263 A1   6/2005   Umeda et al.
2013/0211757 A1   8/2013   Miyamoto
2014/0104236 A1   4/2014   Hamaguchi et al.

FOREIGN PATENT DOCUMENTS

JP         4387773 B2    12/2009
JP         2012-118957 A  6/2012
JP         2013-003603 A  1/2013

*Primary Examiner* — Michael Pervan
(74) *Attorney, Agent, or Firm* — Birch, Stewart, Kolasch & Birch, LLP

(57) ABSTRACT

A touch panel controller (3) includes: a drive section (4); a differential amplifier (5); variable integral capacitors (Cint1, Cint2); and a capacitance control section (6) that controls the variable integral capacitors (Cint1, Cint2) so as to correct line dependency of capacitors (C31 to C34, C41 to S44).

10 Claims, 17 Drawing Sheets

F I G. 2

$$\begin{pmatrix} 1 & 1 & 1 & 1 \\ 1 & -1 & 1 & -1 \\ 1 & 1 & -1 & -1 \\ 1 & -1 & -1 & 1 \end{pmatrix} \begin{pmatrix} C1 \\ C2 \\ C3 \\ C4 \end{pmatrix} = \begin{pmatrix} Y1 \\ Y2 \\ Y3 \\ Y4 \end{pmatrix} \quad \cdots (\text{EXP. 7})$$

$$\begin{pmatrix} 1 & 1 & 1 & 1 \\ 1 & -1 & 1 & -1 \\ 1 & 1 & -1 & -1 \\ 1 & -1 & -1 & 1 \end{pmatrix} \begin{pmatrix} 1 & 1 & 1 & 1 \\ 1 & -1 & 1 & -1 \\ 1 & 1 & -1 & -1 \\ 1 & -1 & -1 & 1 \end{pmatrix} \begin{pmatrix} C1 \\ C2 \\ C3 \\ C4 \end{pmatrix} = \begin{pmatrix} 1 & 1 & 1 & 1 \\ 1 & -1 & 1 & -1 \\ 1 & 1 & -1 & -1 \\ 1 & -1 & -1 & 1 \end{pmatrix} \begin{pmatrix} Y1 \\ Y2 \\ Y3 \\ Y4 \end{pmatrix} \quad \cdots (\text{EXP. 8})$$

$$\begin{pmatrix} 4 & 0 & 0 & 0 \\ 0 & 4 & 0 & 0 \\ 0 & 0 & 4 & 0 \\ 0 & 0 & 0 & 4 \end{pmatrix} \begin{pmatrix} C1 \\ C2 \\ C3 \\ C4 \end{pmatrix} = \begin{pmatrix} 1 & 1 & 1 & 1 \\ 1 & -1 & 1 & -1 \\ 1 & 1 & -1 & -1 \\ 1 & -1 & -1 & 1 \end{pmatrix} \begin{pmatrix} Y1 \\ Y2 \\ Y3 \\ Y4 \end{pmatrix} \quad \cdots (\text{EXP. 9})$$

DRIVING OF ALL DRIVE LINES ON BASIS OF ORTHOGONAL CODE SEQUENCE $$\begin{bmatrix} 1 & 1 & 1 & 1 \\ 1 & -1 & 1 & -1 \\ 1 & 1 & -1 & -1 \\ 1 & -1 & -1 & 1 \end{bmatrix} \begin{bmatrix} C1 \\ C2 \\ C3 \\ C4 \end{bmatrix} = \begin{bmatrix} Y1 \\ Y2 \\ Y3 \\ Y4 \end{bmatrix} \quad \cdots (\text{EXP. 7})$$

CALCULATE INNER PRODUCT $$\begin{bmatrix} 1 & 1 & 1 & 1 \\ 1 & -1 & 1 & -1 \\ 1 & 1 & -1 & -1 \\ 1 & -1 & -1 & 1 \end{bmatrix} \begin{bmatrix} 1 & 1 & 1 & 1 \\ 1 & -1 & 1 & -1 \\ 1 & 1 & -1 & -1 \\ 1 & -1 & -1 & 1 \end{bmatrix} \begin{bmatrix} C1 \\ C2 \\ C3 \\ C4 \end{bmatrix} = \begin{bmatrix} 1 & 1 & 1 & 1 \\ 1 & -1 & 1 & -1 \\ 1 & 1 & -1 & -1 \\ 1 & -1 & -1 & 1 \end{bmatrix} \begin{bmatrix} Y1 \\ Y2 \\ Y3 \\ Y4 \end{bmatrix} \quad \cdots (\text{EXP. 8})$$

$$\begin{bmatrix} 4 & 0 & 0 & 0 \\ 0 & 4 & 0 & 0 \\ 0 & 0 & 4 & 0 \\ 0 & 0 & 0 & 4 \end{bmatrix} \begin{bmatrix} C1 \\ C2 \\ C3 \\ C4 \end{bmatrix} = \begin{bmatrix} 1 & 1 & 1 & 1 \\ 1 & -1 & 1 & -1 \\ 1 & 1 & -1 & -1 \\ 1 & -1 & -1 & 1 \end{bmatrix} \begin{bmatrix} Y1 \\ Y2 \\ Y3 \\ Y4 \end{bmatrix} \quad \cdots (\text{EXP. 9})$$

(b)

DRIVING EACH SINGLE DRIVE LINE $$\begin{bmatrix} 1 & 0 & 0 & 0 \\ 0 & 1 & 0 & 0 \\ 0 & 0 & 1 & 0 \\ 0 & 0 & 0 & 1 \end{bmatrix} \begin{bmatrix} C1 \\ C2 \\ C3 \\ C4 \end{bmatrix} = \begin{bmatrix} Y1 \\ Y2 \\ Y3 \\ Y4 \end{bmatrix} \quad \cdots (\text{EXP. 10})$$

$$\begin{bmatrix} C1 \\ C2 \\ C3 \\ C4 \end{bmatrix} = \begin{bmatrix} Y1 \\ Y2 \\ Y3 \\ Y4 \end{bmatrix} \quad \cdots (\text{EXP. 11})$$

F I G. 4

IN CASE WHERE C1=2.0pF, C2=1.9pF, C3=2.2pF, C4=2.1pF

FOR DRIVING AT Vdrive [V] FOR EACH SINGLE DRIVE LINE $$\left.\begin{array}{l} Y1=-2.0p/Cint*Vdrive \\ Y2=-1.9p/Cint*Vdrive \\ Y3=-2.2p/Cint*Vdrive \\ Y4=-2.1p/Cint*Vdrive \end{array}\right\} \cdots (\text{EXP. 12})$$

FOR DRIVING ALL DRIVE LINES WITH ORTHOGONAL CODE SEQUENCE $$\left.\begin{array}{l} Y1=-8.2p/Cint*Vdrive \\ Y2=-0.2p/Cint*Vdrive \\ Y3=+0.4p/Cint*Vdrive \\ Y4=-0.0p/Cint*Vdrive \end{array}\right\} \cdots (\text{EXP. 13})$$

FIG. 5

$$Y1 = C1sig + C2sig + C3sig + C4sig + Noise1$$
$$Y2 = C1sig - C2sig + C3sig - C4sig + Noise2$$
$$Y3 = C1sig + C2sig - C3sig - C4sig + Noise3$$
$$Y4 = C1sig - C2sig - C3sig + C4sig + Noise4$$
$\cdots$ (EXP. 14)

$$Y1 + Y2 + Y3 + Y4 = 4*C1sig + 2*Noise$$
$$Y1 - Y2 + Y3 - Y4 = 4*C2sig + 2*Noise$$
$$Y1 + Y2 - Y3 - Y4 = 4*C3sig + 2*Noise$$
$$Y1 - Y2 - Y3 + Y4 = 4*C4sig + 2*Noise$$
$\cdots$ (EXP. 15)

$$C1 = C1sig + Noise/2$$
$$C2 = C2sig + Noise/2$$
$$C3 = C3sig + Noise/2$$
$$C4 = C4sig + Noise/2$$
$\cdots$ (EXP. 16)

$$C1 = C1sig + Noise$$
$$C2 = C2sig + Noise$$
$$C3 = C3sig + Noise$$
$$C4 = C4sig + Noise$$
$\cdots$ (EXP. 17)

F I G. 7
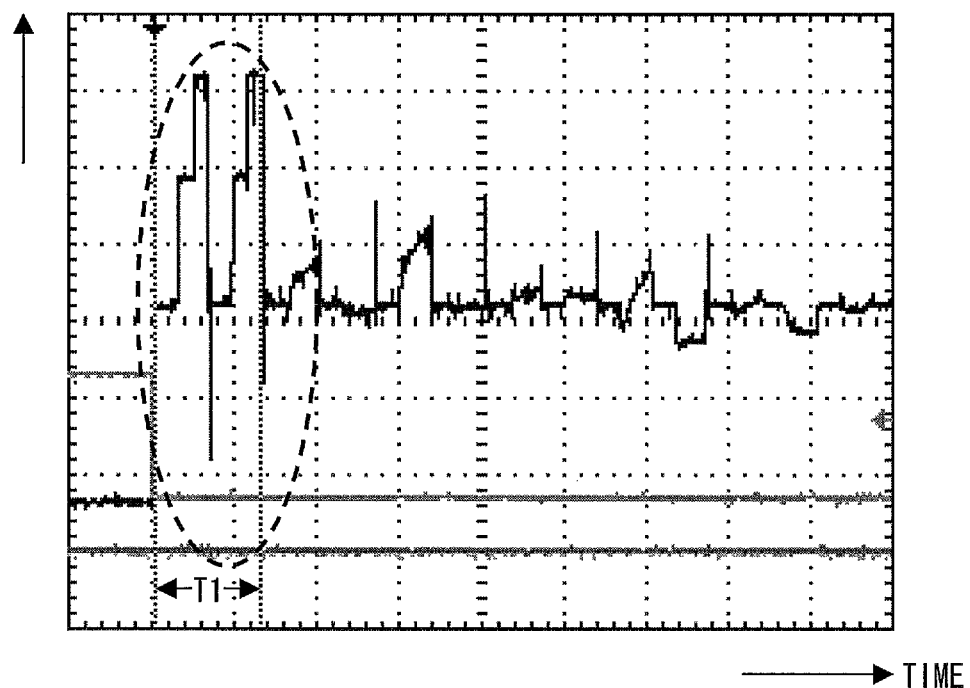

1st vector $\quad \dfrac{-(C_{31})Vdrive}{C_{int}} \quad \cdots (\text{EXP. 1})$ 2nd vector $\quad \dfrac{-(C_{32})Vdrive}{C_{int}} \quad \cdots (\text{EXP. 2})$ $$\begin{pmatrix} 1 & 0 & 0 & 0 \\ 0 & 1 & 0 & 0 \\ 0 & 0 & 1 & 0 \\ 0 & 0 & 0 & 1 \end{pmatrix} \begin{pmatrix} C1 \\ C2 \\ C3 \\ C4 \end{pmatrix} = \begin{pmatrix} Y1 \\ Y2 \\ Y3 \\ Y4 \end{pmatrix} \quad \cdots (\text{EXP. 3})$$

$$\begin{pmatrix} C1 \\ C2 \\ C3 \\ C4 \end{pmatrix} = \begin{pmatrix} Y1 \\ Y2 \\ Y3 \\ Y4 \end{pmatrix} \quad \cdots (\text{EXP. 4})$$

TOUCH PANEL CONTROLLER, INTEGRATED CIRCUIT, TOUCH PANEL SYSTEM, AND ELECTRONIC DEVICE

TECHNICAL FIELD

The present invention relates to a touch panel controller that drives a plurality of drive lines in parallel with each other and thereby estimates or detects the capacitances of capacitors arranged in a matrix manner, an integrated circuit using the same, a touch panel system using the same, and an electronic device using the same.

BACKGROUND ART

Patent Literature 1 discloses a device that detects the values on capacitors distributed in a matrix manner, e.g. a capacitance detecting device that detects a distribution of the electrostatic capacitances of capacitors arranged in rows and columns demarcated by M drive lines and L sense lines. This capacitance detecting device detects the touch of a finger or a pen by detecting a change in capacitance, as a finger or a pen touching an area on the touch panel causes a change in capacitance of a capacitor located in the area.

FIG. 16 is a schematic view showing a configuration of a conventional touch panel system 91. FIG. 17 is a diagram for explaining a method for driving the touch panel system 91. The touch panel system 91 includes a touch panel 92. The touch panel 92 has drive lines DL1 to DL4, sense lines SL1 to SL4, and capacitors C11 to C44 disposed in locations at intersections between the drive lines DL1 to DL4 and the sense lines SL1 to SL4.

The touch panel system 91 is provided with a drive section 94. The drive section 94 drives the drive lines DL1 to DL4 on the basis of a 4×4 code sequence shown in Exp. 3 of FIG. 17. The drive section 94 applies a voltage Vdrive when an element of the code matrix is "1", and applies a zero voltage in the case of an element "0".

The touch panel system 91 has four amplifiers 98 disposed in locations corresponding to the sense lines SL1 to SL4, respectively. The amplifiers 98 receive and amplify linear sums Y1, Y2, Y3, and Y4 of electrostatic capacitances along with the sense lines driven by the drive section 94, respectively.

For example, in the first round of driving of the four rounds of driving based on the 4×4 code sequence, the drive section 94 applies the voltage Vdrive to the drive line DL1 and applies a zero voltage to the remaining drive lines DL2 to DL4. Then, for example, the measured value Y1 from the sense line SL3 corresponding to the capacitor C31 as indicated by Exp. 1 of FIG. 17 is outputted from the amplifier 98.

Then, in the second round of driving, the drive section 94 applies the voltage Vdrive to the drive line DL2 and applies a zero voltage to the remaining drive lines DL1, DL3, and DL4. Then, the measured value Y2 from the sense line SL3 corresponding to the capacitor C32 as indicated by Exp. 2 of FIG. 17 is outputted from the amplifier 98.

Next, in the third round of driving, the drive section 94 applies the voltage Vdrive to the drive line DL3 and applies a zero voltage to the remaining drive lines. After that, in the fourth round of driving, the drive section 94 applies the voltage Vdrive to the drive line DL4 and applies a zero voltage to the remaining drive lines.

Then, as indicated by Exp. 3 and Exp. 4 of FIG. 17, the measured values Y1, Y2, Y3, and Y4 per se are associated with the electrostatic capacitances C1, C2, C3, and C4, respectively. In Exp. 3 and Exp. 4 of FIG. 17, the measured values Y1, Y2, Y3, and Y4 are described with the omission of a coefficient (−Vdrive/Cint) for simplicity of notation.

CITATION LIST

Patent Literature 1

Japanese Patent No. 4387773 (published on Jun. 16, 2005)

SUMMARY OF INVENTION

Technical Problem

However, with the aforementioned configuration shown in FIGS. 16 and 17, it is only possible to obtain data on a capacitor at an intersection with a single drive line in a single measurement; therefore, the noise component is large, and correct detection of a change in capacitance of a capacitor requires an averaging procedure to be performed by repeating similar sensing operations more than once, which undesirably makes it hard to raise the processing speed.

It is an object of the present invention to provide a touch panel controller that is capable of correctly detecting a change in capacitance of a capacitor with fewer sensing operations, an integrated circuit having the same integrated therewith, a touch panel device, and an electronic device.

Solution to Problem

In order to attain the foregoing object, a touch panel controller according to the present invention includes: a drive section which drives M drive lines for (i) a plurality of first capacitors respectively formed between M drive lines and a first sense line and (ii) a plurality of second capacitors respectively formed between the M drive lines and a second sense line that is adjacent to the first sense line, and which thereby causes a first linear sum output from the plurality of first capacitors to be outputted from the first sense line and causes a second linear sum output from the plurality of second capacitors to be outputted from the second sense line; and a differential amplifier which amplifies the difference between the first linear sum output and the second linear sum output, the differential amplifier having a non-inverting input terminal via which the differential amplifier receives the first linear sum output, a first output terminal corresponding to the non-inverting input terminal, an inverting input terminal via which the differential amplifier receives the second linear sum output, a second output terminal corresponding to the inverting input terminal, the touch panel controller further including: a first variable integral capacitor coupled to the non-inverting input terminal and to the first output terminal; a second variable integral capacitor coupled to the inverting input terminal and to the second output terminal; and control means which controls the value on at least either the first variable integral capacitor or the second variable integral capacitor so as to correct line dependency of the first and second capacitors.

An integrated circuit according to the present invention includes a touch panel controller according to the present invention integrated therewith.

A touch panel system according to the present invention includes a touch panel controller according to the present invention mounted therein.

An electronic device according to the present invention includes a touch panel controller according to the present invention mounted therein.

Advantageous Effects of Invention

A touch panel controller according to the present invention controls the value on at least either the first variable integral capacitor or the second variable integral capacitor so as to correct line dependency of the first and second capacitors. This makes it possible to correctly detect a change in capacitance of any of the first and second capacitors that has been touched, even when the first and second capacitors are those manufactured to have different values depending on the lines due to the influence of manufacturing processes.

BRIEF DESCRIPTION OF DRAWINGS

FIG. 2 is a diagram showing mathematical expressions for estimating capacitances by driving the touch panel system on the basis of an orthogonal code sequence.

FIG. 3 is a set of diagrams (a) and (b) for explaining a reason why driving of all drive lines on the basis of an orthogonal code sequence is advantageous, (a) showing a mathematical expression for estimating capacitances by driving all drive lines on the basis of an orthogonal code sequence, (b) showing a mathematical expression for finding capacitances by driving each single drive line.

FIG. 4 is a diagram for explaining a reason why driving of all drive lines on the basis of an orthogonal code sequence is advantageous.

FIG. 5 is a diagram for explaining a reason why driving of all drive lines on the basis of an orthogonal code sequence is advantageous.

FIG. 7 is a graph for explaining a problem caused by the touch panel system.

FIG. 11 is a diagram showing a decoding matrix for decoding in the case of driving based on the M-sequence code.

FIG. 12 is a diagram showing a result of calculation of the inner product of measured values and the decoding matrix.

FIG. 17 is a diagram for explaining a method for driving the touch panel system.

DESCRIPTION OF EMBODIMENTS

The applicant of the present application proposed, in Earlier Filed Patent Application 1 (Patent Application No. 2011-0220222 filed in Japan on Feb. 9, 2011; Priority Date: Nov. 12, 2010), a touch panel system that estimates capacitances by driving a plurality of drive lines in parallel with each other, and the present embodiment is premised on this proposed touch panel system. Further, the applicant of the present application proposed, in Earlier Filed Patent Application 2 (Patent Application No. 2011-130604 filed in Japan on Jun. 10, 2011; "TOUCH PANEL CONTROLLER AND ELECTRONIC DEVICE USING THE SAME"), a touch panel system having correcting means for correcting a difference in capacitance between a sense line and a drive line, and the present embodiment is premised on this proposed touch panel system.

Therefore, the touch panel systems proposed in Earlier Filed Patent Applications 1 and 2 as the premise on which the present embodiment is based are described first, and then various touch panel systems according to the present embodiment are described.

(Premise on which the Present Embodiment is Based)
(Driving Based on an Orthogonal Code Sequence)

Figure 1:
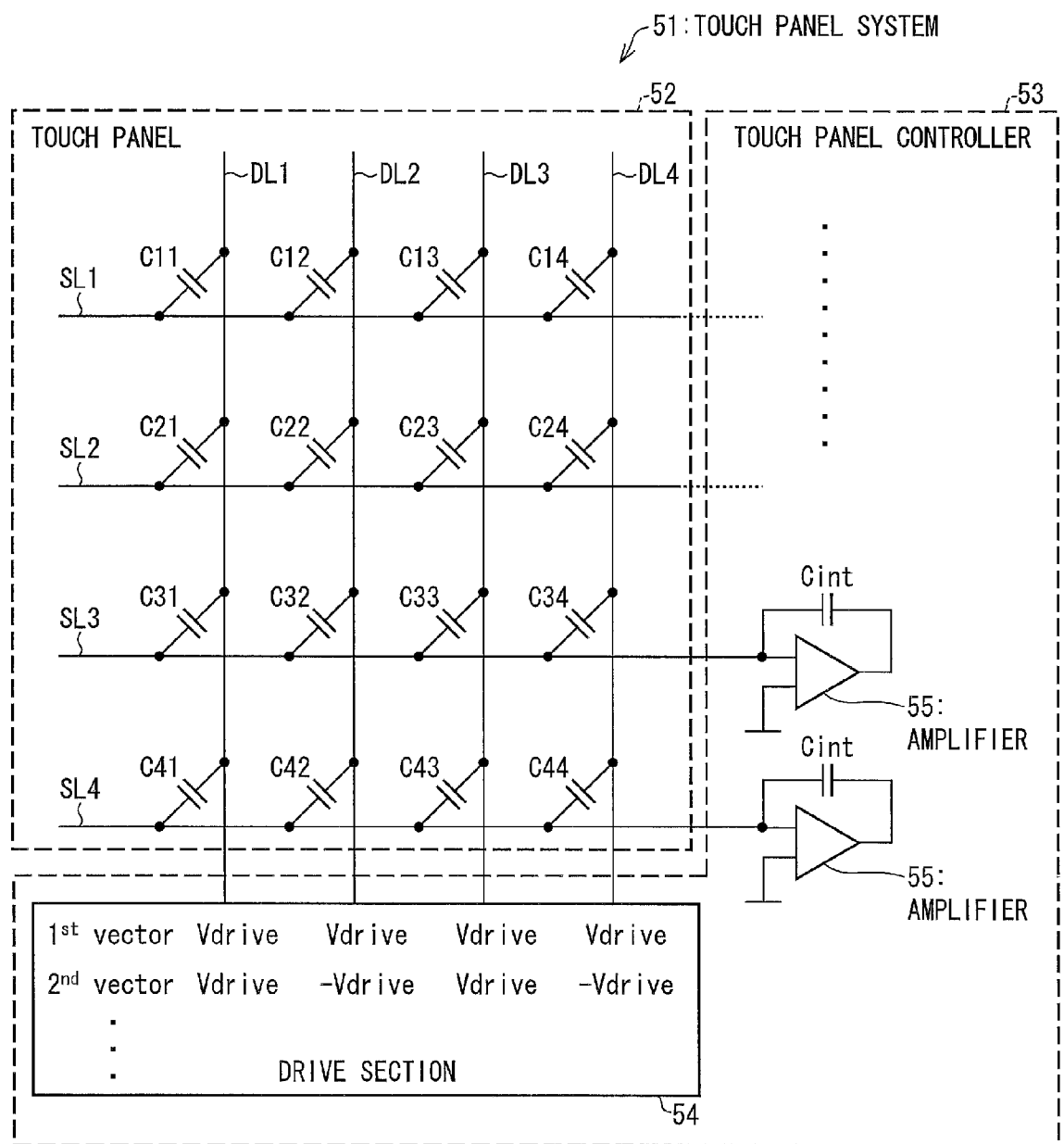
FIG. 1 is a schematic view showing a configuration of a touch panel system on which an embodiment is premised.

FIG. 1 is a schematic view showing a configuration of a touch panel system 51 on which an embodiment is premised. FIG. 2 is a diagram showing mathematical expressions for estimating capacitances by driving the touch panel system 51 on the basis of an orthogonal code sequence. The touch panel system 51 includes a touch panel 52 and a touch panel controller 53. The touch panel 52 has drive lines DL1 to DL4, sense lines SL1 to SL4, and capacitors C11 to C44 disposed in locations at intersections between the drive lines DL1 to DL4 and the sense lines SL1 to SL4.

The touch panel controller 53 is provided with a drive section 54. The drive section 54 drives the drive lines DL1 to DL4 on the basis of a 4×4 orthogonal code sequence shown in Exp. 7 of FIG. 2. An element of an orthogonal code sequence is either "1" or "−1". In the case of an element "1", the drive section 54 applies a voltage Vdrive, and in the case of an element "−1", the drive section 54 applies −Vdrive. It should be noted here that the voltage Vdrive may be a power supply voltage, but may alternatively be a voltage other than the power supply voltage.

As used herein, the term "orthogonal code sequence" means that the code sequence di=(di1, di2, . . . , diN) (i=1, . . . , M) of the code length N satisfies the following condition:

[Math. 1]

$$di \cdot dk = \sum_{j=1}^{N} dij \times dkj$$
$$= N \times \delta ik,$$

where $\delta ik = 1$ if $1 = k$ $\delta ik = 0$ if $i \neq k$.

An example of the "orthogonal code sequence" is a Hadamard matrix that is generated by Sylvester's method.

A Hadamard matrix based on Sylvester's method forms a 2×2 basic unit as its basic structure. The upper right, upper left, and lower left bits of this basic unit are identical, and the lower right bit is a bit inversion thereof.

Next, four of those 2×2 basic elements mentioned above are combined as upper right, upper left, lower right, and lower left blocks into a code of bits arranged 4×4. As with the creation of a 2×2 basic unit, the lower right block is a bit inversion. In a similar process, a code of bits arranged 8×8 and a code of bits arranged 16×16 are generated. These matrices satisfy the aforementioned definition of the "orthogonal code sequence" of the present invention. The 4×4 orthogonal code sequences shown in FIG. 2 are 4×4 Hadamard matrices based on Sylvester's method.

As used herein, the term "Hadamard matrix" refers to a square matrix whose element is either 1 or −1 and whose rows are orthogonal to each other. That is, any two rows of a Hadamard matrix represent vectors at right angles to each other.

For the "orthogonal code sequence" according to the present invention, a matrix of N rows arbitrarily taken out from an M-th Hadamard matrix, too, can be used (where N≤M). As will be mentioned below, a Hadamard matrix based on a method other than Sylvester's method can be applied to the present invention.

An N-th Hadamard matrix based on Sylvester's method is an exponentiation of M=2. If M is a multiple of 4, there exits an expectation that there exits a Hadamard matrix. For example, when M=12 and when M=20, there exits a Hadamard matrix. These Hadamard matrices based on a method other than Sylvester's method, too, can be used as orthogonal code sequences according to the present invention.

The touch panel system 51 has four amplifiers 55 disposed in locations corresponding to the sense lines SL1 to SL4, respectively. The amplifiers 55 receive and amplify linear sums Y1, Y2, Y3, and Y4 of capacitances along with the sense lines driven by the drive section 54, respectively.

For example, in the first round of driving of the four rounds of driving based on the 4×4 orthogonal code sequence, the drive section 54 applies the voltage Vdrive to all of the drive lines DL1 to DL4. Then, for example, the measured value Y1 from the sense line SL3 as shown below in Exp. 5 is outputted from the amplifier 55. Then, in the second round of driving, the drive section 54 applies the voltage Vdrive to the drive lines DL1 and DL3 and applies −Vdrive to the remaining drive lines DL2 and DL4. Then, the measured value Y2 from the sense line SL3 as shown below in Exp. 6 is outputted from the amplifier 55.

[Math. 2]

$$1^{st}\ \text{vector}\ \frac{-(C_{31} + C_{32} + C_{33} + C_{34})Vdrive}{C_{int}} \qquad \text{Exp. 5}$$

$$2^{nd}\ \text{vector}\ \frac{-(C_{31} - C_{32} + C_{33} - C_{34})Vdrive}{C_{int}} \qquad \text{Exp. 6}$$

Next, in the third round of driving, the drive section 54 applies the voltage Vdrive to the drive lines DL1 and DL2 and applies −Vdrive to the remaining drive lines DL3 and DL4. Then, the measured value Y3 from the sense line SL3 is outputted from the amplifier 55. After that, in the fourth round of driving, the drive section 54 applies the voltage Vdrive to the drive lines DL1 and DL4 and applies −Vdrive to the remaining drive lines DL2 and DL3. Then, the measured value Y4 from the sense line SL3 is outputted from the amplifier 55.

For simplicity of explanation, the capacitors C31 to C34 shown in FIG. 1 are indicated by C1, C2, C3, and C4, respectively, in Exp. 7 to Exp. 9 of FIG. 2. In Exp. 7 to Exp. 9 of FIG. 2 and (a) of FIG. 3 and Exp. 10 and Exp. 11 of (b) of FIG. 3, the measured values Y1 to Y4 are described with the omission of a coefficient (−Vdrive/Cint) for simplicity of notation.

Moreover, by obtaining the inner product of the measured values Y1, Y2, Y3, and Y4 and the orthogonal code sequence as indicated by Exp. 8 of FIG. 2, the electrostatic capacitances C1 to C4 can be estimated as indicated by Exp. 9.

(Reason Why Driving Based on an Orthogonal Code Sequence is Advantageous)

FIG. 3 is a set of diagrams (a) and (b) for explaining a reason why driving of all drive lines on the basis of an orthogonal code sequence is advantageous, (a) showing a mathematical expression for estimating capacitances by driving all drive lines on the basis of an orthogonal code sequence, (b) showing a mathematical expression for finding capacitances by driving each single drive line. FIGS. 4 and 5 are each a diagram for explaining a reason why driving of all drive lines on the basis of an orthogonal code sequence is advantageous.

For simplicity of description, the following discusses not a scheme for detecting a difference in capacitance with a differential amplifier but an operation in a single mode in which an amplifier is disposed for each separate sense line. As shown in FIG. 4, for example, in a case where C1=2.0 pF, C2=1.9 pF, C3=2.2 pF, and C4=2.1 pF, the scheme for driving at Vdrive [V] for each single drive line as mentioned above in FIGS. 3 and 4 causes the measured values Y1 to Y4 of linear sum output to be 1.9 to 2.2 p/Cint×Vdrive as indicated by Exp. 12.

Meanwhile, the scheme for driving all drive lines with an orthogonal code sequence as mentioned above in FIGS. 1 and 2 causes the measured value Y1 of linear sum output to be −8.2 p/Cint×Vdrive and the measured values Y2 to Y4 to be +0.4 to −0.2 p/Cint×Vdrive.

For the measured values Y2 to Y4, the driving scheme based on an orthogonal code sequence is smaller in signal component. Output of the measured value Y1, at which all elements of the orthogonal code sequence are "1", is large. This makes it necessary to ensure a large dynamic range. However, with a configuration in which a difference in capacitance is extracted by a differential amplifier, the output of the measured value Y1 cannot be large.

Assuming that the noises Noise 1 to Noise 4 shown in Exp. 14 of FIG. 5 are uncorrelated, the scheme for driving all drive lines on the basis of an orthogonal code sequence, as indicated by Exp. 16 and Exp. 17, is advantageous in terms of noise over the scheme for driving for each single drive. A possible reason why the scheme for driving all drive lines on the basis of an orthogonal code sequence is advantageous in terms of SN ratio (noise) is that since data representing electrostatic capacitances at intersections with a plurality of drive lines is obtained in a single measurement and therefore a code length of data is obtained, the noise component becomes smaller in view of an SN ratio after inner production operation. Further, assuming that L is the code length, the SN ratio becomes advantageous by $L^{1/2}$. This is especially advantageous when the scheme for driving all drive lines on the basis of an orthogonal code sequence is applied to a large-sized panel.

Further, with a differential configuration in which a difference in capacitance is extracted by a differential amplifier, only a component of difference in electrostatic capacitance is extracted; therefore, for example, assuming that the change in capacitance is 10% with the capacitance component as 2 pF, the absolute capacitance component is not outputted, as only 0.2 pF is extracted. This makes it possible to make the integral capacitance relatively smaller (make the gain larger) and to moderate the specifications of which an AD converter is required.

(Configuration of Another Touch Panel System 61 on which an Embodiment is Premised)

Figure 6:
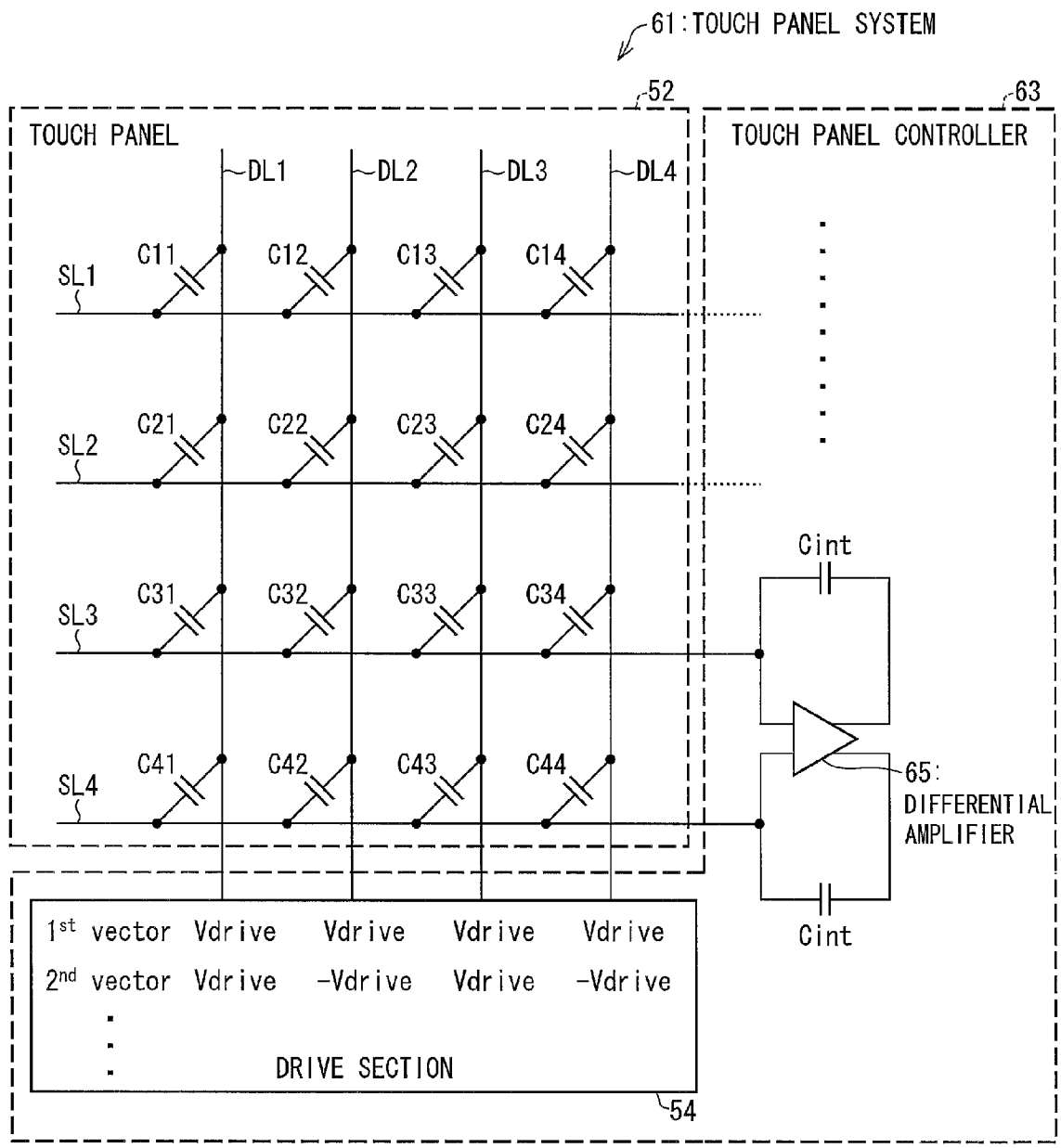
FIG. 6 is a schematic view showing a configuration of another touch panel system on which an embodiment is premised.

FIG. 6 is a schematic view showing a configuration of another touch panel system 61 on which an embodiment is premised. FIG. 7 is a graph for explaining a problem caused by the touch panel system 61. Those constituent elements which are the same as those described above with reference to FIG. 1 are given the same reference signs. These constituent elements are not repeatedly described in detail below.

The touch panel system 61 includes a touch panel 52 and a touch panel controller 63. The touch panel controller 63 has differential amplifiers 65. Each of the differential amplifiers 65 amplifies a difference between linear sum outputs that are outputted sense lines adjacent to each other. Each of the differential amplifiers 65 is provided with a pair of integral capacitors Cint corresponding respectively to the sense lines adjacent to each other. For simplification of explanation, FIG. 6 shows only a differential amplifier 65 coupled to the sense lines SL3 and SL4. The drive section 54, as with the drive section 54 shown in FIG. 1, drives the drive lines DL1 to DL4 on the basis of a 4×4 Sylvester's method-based Hadamard matrix shown in FIG. 2.

(Attention Focused on a Problem to be Solved by the Invention)

The inventors of Patent Application 2 found such a problem that driving of the drive lines DL1 to Dl4 with the aforementioned configuration causes the output from the differential amplifier 65 to be abnormally larger to go off scale in a period T1 corresponding to the first round of driving based on the Hadamard matrix during which all of the drive lines DL1 to DL4 are driven by Vdrive than in periods of the second and subsequent rounds of driving as shown in FIG. 7.

The touch panel system 61 shown in FIG. 6 is configured such that in the first round of driving of the four rounds of driving based on an orthogonal code sequence of a Hadamard matrix based on Sylvester's method, the drive section 54 applies the voltage Vdrive to all of the drive lines DL1 to DL4. Then, the linear sum output indicated below by Exp. 18 is outputted from the differential amplifier 65 coupled to the sense lines SL3 and SL4. Then, in the second round of driving, the drive section 54 applies the voltage Vdrive to the drive lines DL1 and DL3 and applies −Vdrive to the remaining drive lines DL2 and DL4. Then, the linear sum output indicated below by Exp. 19 is outputted from the differential amplifier 65.

[Math. 3]

$$1^{st} \text{ vector } \frac{(C_{41}+C_{42}+C_{43}+C_{44})Vdrive}{C_{int}} - \frac{(C_{31}+C_{32}+C_{33}+C_{34})Vdrive}{C_{int}} = \frac{((C_{41}-C_{31})+(C_{42}-C_{32})+(C_{43}-C_{33})+(C_{44}-C_{33}))Vdrive}{C_{int}} \quad \text{Exp. 18}$$

$$2^{nd} \text{ vector } \frac{(C_{41}-C_{42}+C_{43}-C_{44})Vdrive}{C_{int}} - \frac{(C_{31}-C_{32}+C_{33}-C_{34})Vdrive}{C_{int}} = \frac{((C_{41}-C_{31})-(C_{42}-C_{32})+(C_{43}-C_{33})-(C_{44}-C_{33}))Vdrive}{C_{int}} \quad \text{Exp. 19}$$

As indicated by Exp. 18, the application of the voltage Vdrive to all of the drive lines DL1 to DL4 causes a linear sum to be outputted from the differential amplifier 65. The linear sum is a value obtained by subtracting the electrostatic capacitance coupled to the sense line SL3 from the electrostatic capacitance coupled to the sense line SL4.

Since the capacitors formed in the touch panel 52 are those manufactured so that all of their capacitances identical values, the capacitances of the capacitors are supposed to be identical values, and zero is supposed to be outputted from the differential amplifier 65 when the drive lines are driven with no finger, pen, or the like touching the touch panel 52.

In reality, however, the values on the capacitors formed in the touch panel 52 vary due to the influence of manufacturing processes. If the variations in the values on the capacitors are random, there will be so many combinations of additions and subtractions that the variations in the values on the capacitors cancel each other out. Therefore, it is impossible that only a voltage pattern at a particular timing can become larger as shown in FIG. 7. However, the result of experimentation by the inventors of the present invention shows that the output from the differential amplifier 65 tends to become abnormally larger only in the period T1 corresponding to the first round of driving based on the Hadamard matrix. This tendency is unexplainable.

Due to the influence of the parasitic capacitance, parasitic component, sense line wiring pattern, etc. of a substrate on which the sense lines are formed, the capacitance for each sense line is considered to have such sense line dependency that it is not constant but changes with a gradient along a long side of a drive line. Moreover, if the electrostatic capacitance of the touch panel 52 has such sense line dependency, the output from the differential amplifier 65 in the first round of driving based on the Hadamard matrix based on Sylvester's method during which all of the drive lines DL1 to DL4 are driven by Vdrive can become abnormally larger. Such a phenomenon often occurs in the measurement of touch panels actually manufactured. The present invention has an aspect to solve the problem.

(Configuration of Still Another Touch Panel System 81 on which an Embodiment is Premised)

Figure 8:
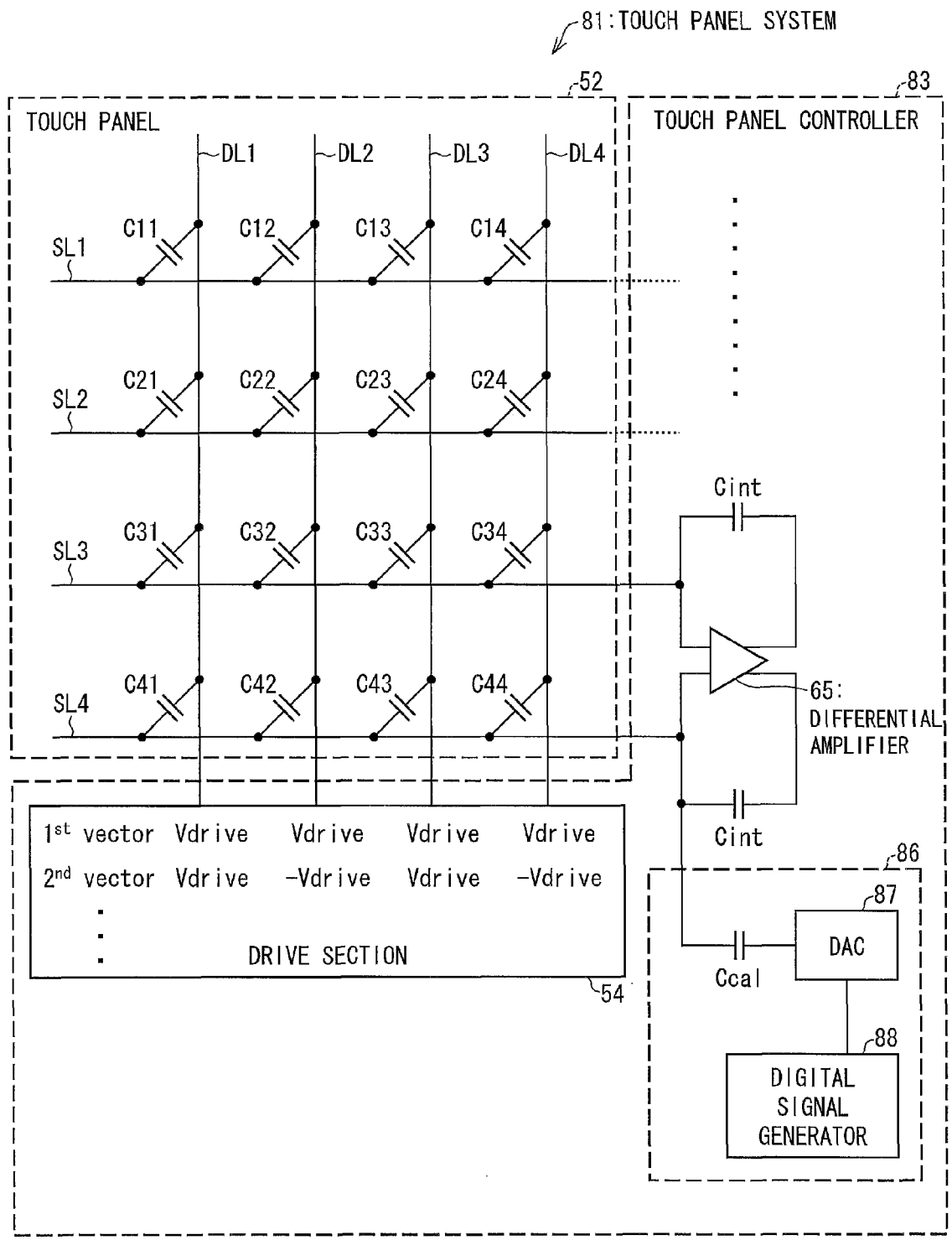
FIG. 8 is a schematic view showing a configuration of still another touch panel system on which an embodiment is premised.

FIG. 8 is a schematic view showing a configuration of still another touch panel system 81 on which an embodiment is premised. Those constituent elements which are the same as those described above with reference to FIGS. 1 and 6 are given the same reference signs. These constituent elements are not repeatedly described in detail below.

In order to solve the aforementioned sense line dependency of capacitances, the touch panel system 81 has an offsetting section 86 that offsets the line dependency. The offsetting section 86 includes a coupling capacitor Ccal via which a signal for offsetting the line dependency is inputted, a DA converter 87 for generating a signal to be supplied to the coupling capacitor Ccal for offsetting the line dependency, and a digital signal generator 88 that generates a digital signal to be inputted to the DA converter 87. This makes the circuitry of a touch panel controller 83 complex, thus inviting problems such as increases in the area and electric power consumption of the touch panel controller 83. The present embodiment has an aspect to solve the problem.

(Embodiment 1)

(Configuration of a Touch Panel System 1)

Figure 9:
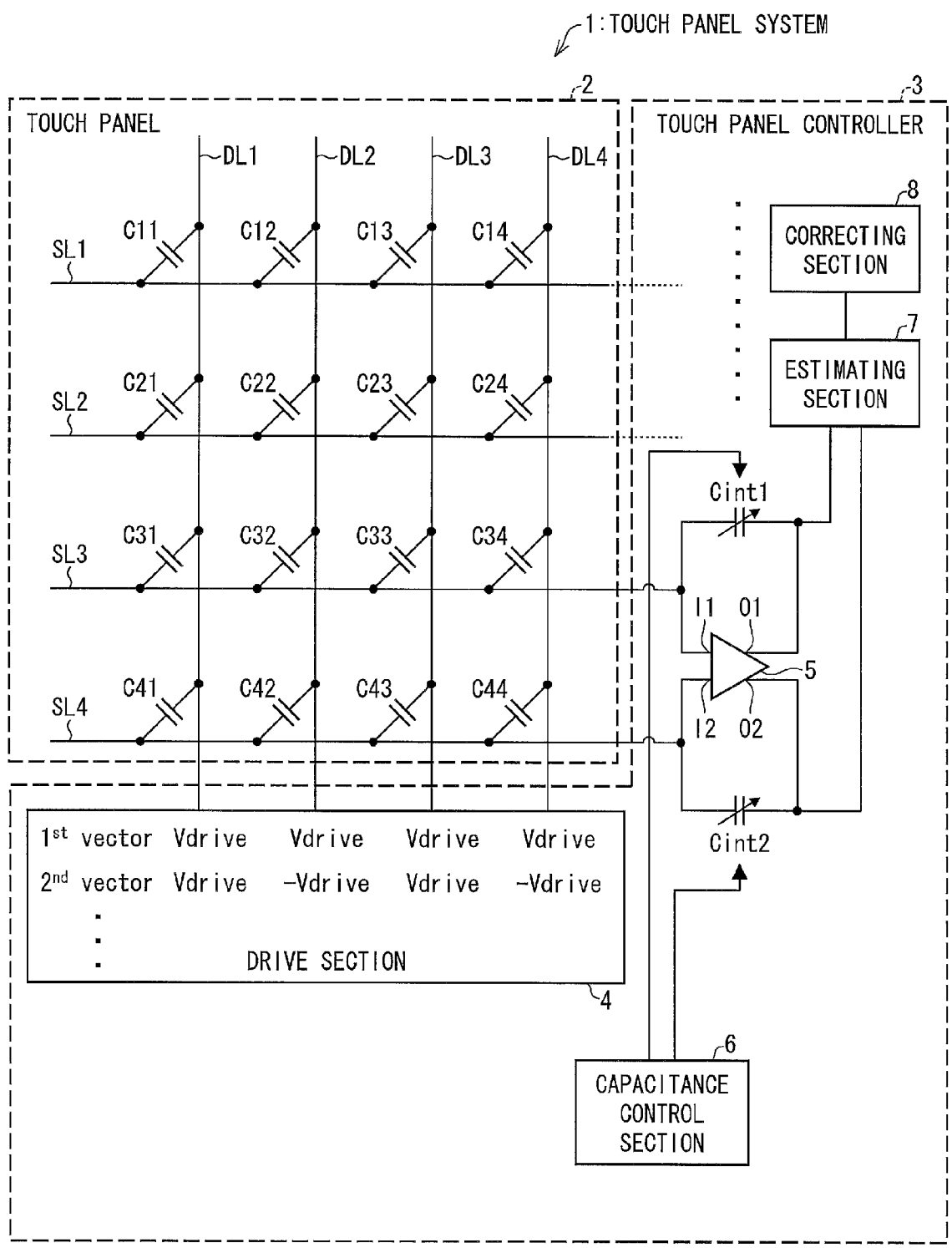
FIG. 9 is a schematic view showing a configuration of a touch panel system according to Embodiment 1.

FIG. 9 is a schematic view showing a configuration of a touch panel system 1 according to Embodiment 1.

The touch panel system 1 includes a touch panel 2 and a touch panel controller 3. The touch panel controller 3 has a drive section 4. The drive section 4, as with the drive section 54 shown in FIG. 1, drives the drive lines DL1 to DL4 on the basis of a 4×4 Sylvester's method-based Hadamard matrix shown in Exp. 7 of FIG. 2.

The touch panel controller 3 has differential amplifiers 5. Each of the differential amplifiers 5 amplifies a difference between linear sum outputs that are outputted from sense lines adjacent to each other. Each of the differential amplifiers 5 is provided with variable integral capacitors $C_{int1}$ and $C_{int2}$ corresponding respectively to the sense lines adjacent to each other.

Each of the differential amplifiers 5 has a non-inverting input terminal I1 coupled to the sense line SL3, an output terminal O1 corresponding to the non-inverting input terminal I1, an inverting input terminal I2 coupled to the sense line SL4, and an output terminal O2 corresponding to the inverting input terminal I2.

The integral capacitor $C_{int1}$ is coupled to the non-inverting input terminal I1 and to the output terminal O1. The integral capacitor $C_{int2}$ is coupled to the inverting input terminal I2 and to the output terminal O2.

For simplification of explanation, FIG. 9 shows only a differential amplifier 5 coupled to the sense lines SL3 and SL4. Connected to the sense line SL3 are capacitors $C_{31}$, $C_{32}$, $C_{33}$, and $C_{34}$ (plurality of first capacitors). Connected to the sense line SL4 are capacitors $C_{41}$, $C_{42}$, $C_{43}$, and $C_{44}$ (plurality of second capacitors). The touch panel controller 3 has a capacitance control section 6 for controlling the capacitances of the variable integral capacitors $C_{int1}$ and $C_{int2}$.

The capacitance control section 6 controls the value on at least either the integral capacitor $C_{int1}$ or $C_{int2}$ so as to correct line dependency of the capacitors $C_{31}$, $C_{32}$, $C_{33}$, and $C_{34}$ and the capacitors $C_{41}$, $C_{42}$, $C_{43}$, and $C_{44}$.

The touch panel controller 3 is provided with an estimating section 7. The estimating section 7 estimates the capacitances of the capacitors $C_{31}$, $C_{32}$, $C_{33}$, and $C_{34}$ (plurality of first capacitors) and the capacitors $C_{41}$, $C_{42}$, $C_{43}$, and $C_{44}$ (plurality of second capacitors) in accordance with the inner product of the difference between a first linear sum output and a second linear sum output as amplified by the differential amplifier 5 and the code sequence on the basis of which the drive lines DL1 to DL4 were driven.

The touch panel controller 3 is provided with a correcting section 8. The correcting section 8 corrects, in accordance with the value on the variable integral capacitor $C_{int2}$ as controlled by the capacitance control section 6, the values on the capacitors $C_{41}$, $C_{42}$, $C_{43}$, and $C_{44}$ (plurality of second capacitors) as estimated by the estimating section 7.

The correcting section 8 corrects the capacitances of the capacitors $C_{41}$, $C_{42}$, $C_{43}$, and $C_{44}$ (plurality of second capacitors) so as to cancel out a change in the value on the integral capacitor $C_{int2}$ as controlled by the capacitance control section 6.

(Operation of the Touch Panel System 1)

The case discussed here is a case where $1^{st}$ vector shown in FIG. 9 is applied to the touch panel system 1. Further, it is assumed that there is no touch input. The output signal Y from the differential amplifier 5 is expressed as

[Math. 4]

$$Y = V_{Drive}\frac{C_{31}+C_{32}+C_{33}+C_{34}}{C_{int1}} - V_{Drive}\frac{C_{41}+C_{42}+C_{43}+C_{44}}{C_{int2}} \quad \text{Exp. 20}$$

The case discussed first is a case where the variable integral capacitances $C_{int1}$ and $C_{int2}$ are not controlled. It is assumed here that $C_{int1}=C_{int2}=C_{int}$. The output signal Y is expressed as

[Math. 5]

$$Y = V_{Drive}\frac{(C_{31}+C_{32}+C_{33}+C_{34})-(C_{41}+C_{42}+C_{43}+C_{44})}{C_{int}} \quad \text{Exp. 21}$$

The case discussed here is a case where there is no drive line dependency but there is only sense line dependency. That is, $C_{31}=C_{32}=C_{33}=C_{34}=C_3$ and $C_{41}+C_{42}+C_{43}+C_{44}=C_4$, with the sense line dependency as $C_3-C_4=\Delta C$. The case discussed here is a case where there is a sense-line-dependent capacitance change in the sense line SL4. That is, it is assumed that the capacitors of the sense line SL3 have the same capacitances as those of the sense lines SL1 and SL2. In this case, the output signal Y is expressed as

[Math. 6]

$$Y = V_{Drive}\frac{4\cdot C_3 - 4\cdot C_4}{C_{int}} = V_{Drive}\frac{4\cdot (C_4+\Delta C)-4\cdot C_4}{C_{int}} = V_{Drive}\frac{4\cdot \Delta C}{C_{int}} \quad \text{Exp. 22}$$

As indicated by Exp. 22, the output signal Y from the differential amplifier 5 depends on sense line dependency $\Delta C$. In a case where the sense line dependency $\Delta C$ is large, there is a possibility that the output signal Y from the differential amplifier 5 becomes large to exceed the power supply voltage, i.e. that the amplifier 5 gets saturated.

The case discussed here is a case where the variable integral capacitances $C_{int1}$ and $C_{int2}$ are independently controlled. The output signal Y from the differential amplifier 5 is expressed as

[Math. 7]

$$Y = V_{Drive}\frac{C_{31}+C_{32}+C_{33}+C_{34}}{C_{int1}} - V_{Drive}\frac{C_{41}+C_{42}+C_{43}+C_{44}}{C_{int2}} \quad \text{Exp. 23}$$

$$Y = V_{Drive}\left(\frac{4\cdot C_3}{C_{int1}} - \frac{4\cdot C_4}{C_{int2}}\right) = V_{Drive}\left(\frac{4\cdot (C_4+\Delta C)}{C_{int1}} - \frac{4\cdot C_4}{C_{int2}}\right) \quad \text{Exp. 24}$$

If the variable integral capacitance $C_{int2}$ is here controlled as indicated below by Exp. 25,

[Math 8]

$$C_{int2} = C_{int1}\cdot \frac{C_4}{C_4+\Delta C} \quad \text{Exp. 25}$$

the output signal Y from the differential amplifier 5 is expressed as indicated below in Exp. 26

[Math. 9]

$$Y = V_{Drive}\left(\frac{4\cdot C_3}{C_{int1}} - \frac{4\cdot C_4}{C_{int2}}\right) = V_{Drive}\left(\frac{4\cdot (C_4+\Delta C)}{C_{int1}} - \frac{4\cdot C_4}{C_{int1}\cdot \frac{C_4}{C_4+\Delta C}}\right) = 0 \quad \text{Exp. 26}$$

Since the output signal Y from the differential amplifier 5 does not contain a component that depends on the sense line dependency $\Delta C$, there appears to be no tendency to saturation.

The example shown above is one in which the variable integral capacitance $C_{int2}$ is controlled to have the relationship indicated above by Exp. 25. However, the present invention is not limited to this example. In a case where there is a sense-line-dependent capacitance change in the sense line SL3, the integral capacitance $C_{int1}$ may be controlled to have the relationship indicated above by Exp. 25. In a case where there are sense-line-dependent capacitance changes in both the sense lines SL3 and SL4, the integral capacitances $C_{int1}$ and $C_{int2}$ may both be controlled to have the relationship indicated above by Exp. 25.

Then, the estimating section 7 estimates the electrostatic capacitance of the touch panel by calculating the inner product of the output signal Y from the differential amplifier 5 and the code on the basis of which the driving was performed.

In this case, since the capacitance of the integral capacitor $C_{int2}$ is $C_{int1} \times C_4/(C_4+\Delta C)$ as described above, a gain of $(C_4+\Delta C)/C_4$ is applied to the estimated capacitance of the sense line SL4, assuming that a gain of 1 is applied to the estimated values of the other sense lines. In this case, the gain difference may be corrected by the correcting section 8 multiplying the estimated capacitance of the sense line SL4 by $C_4/(C_4+\Delta C)$. In this way, the correcting section 8 corrects the values on the capacitors $C_{41}$, $C_{42}$, $C_{43}$, and $C_{44}$ (plurality of second capacitors) so as to cancel out a change in the value on the integral capacitance $C_{int2}$ as controlled by the capacitance control section 6.

The example shown in Embodiment 1 is one in which the driving is performed in order from the first line of an orthogonal code sequence composed of a Hadamard matrix. However, the present invention is not limited to this example. The driving may be performed in order from the last line of the Hadamard matrix, or may be performed in order of the rows rearranged. The same applies to the after-mentioned embodiments.

Embodiment 1 has shown an example of driving based on an orthogonal code sequence. However, the present invention is not limited to this example. Driving may be performed on the basis of a code sequence other than an orthogonal code sequence, e.g. a code sequence based on an M-sequence. The same applies to the after-mentioned embodiments. However, driving based on an orthogonal code sequence brings about an advantage of yielding a higher SN ratio than does driving based on a code sequence based on an M-sequence.

Figure 10:
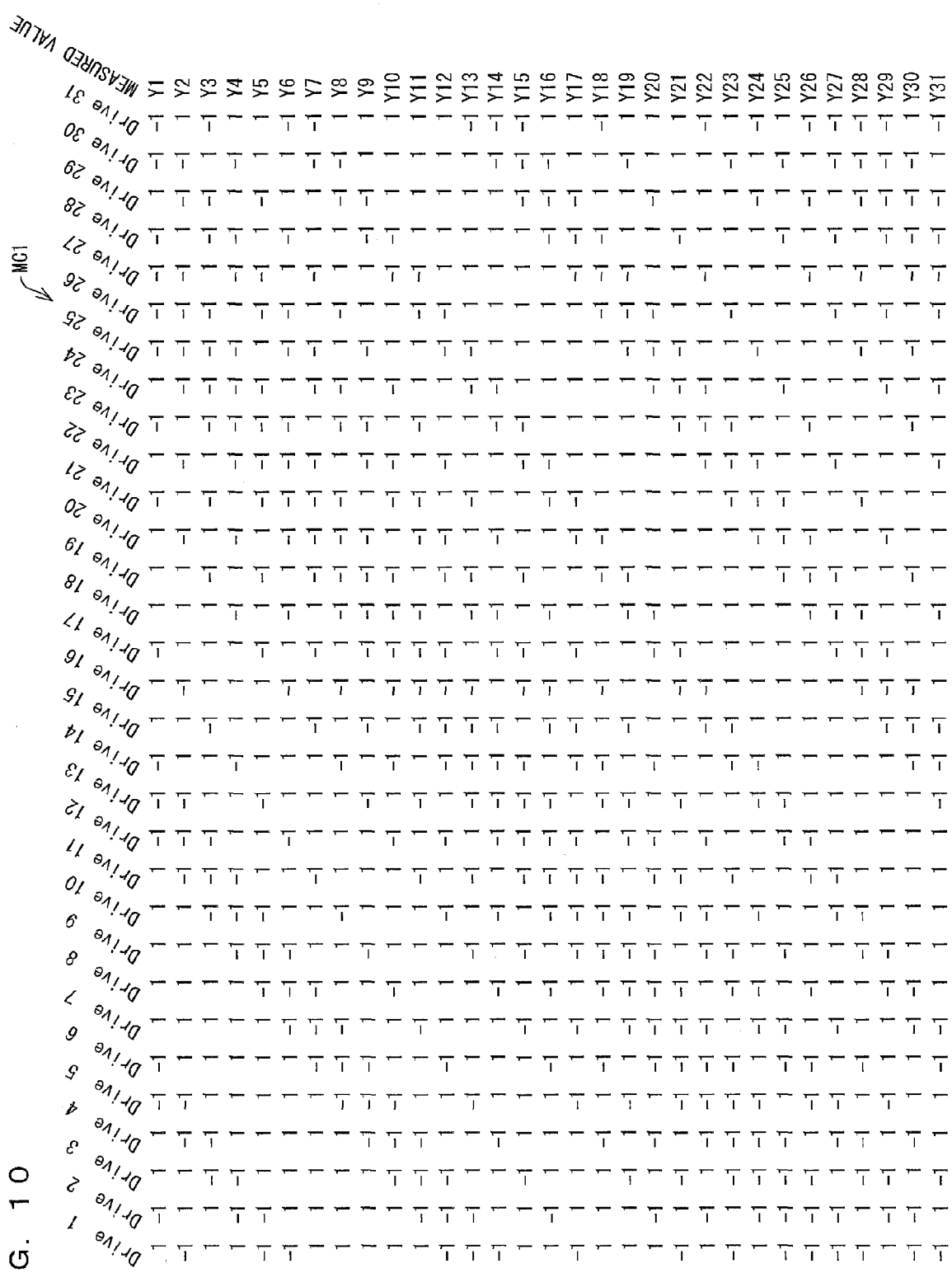
FIG. 10 is a diagram showing an M-sequence code on the basis of which the touch panel system is driven.
Figure 11:
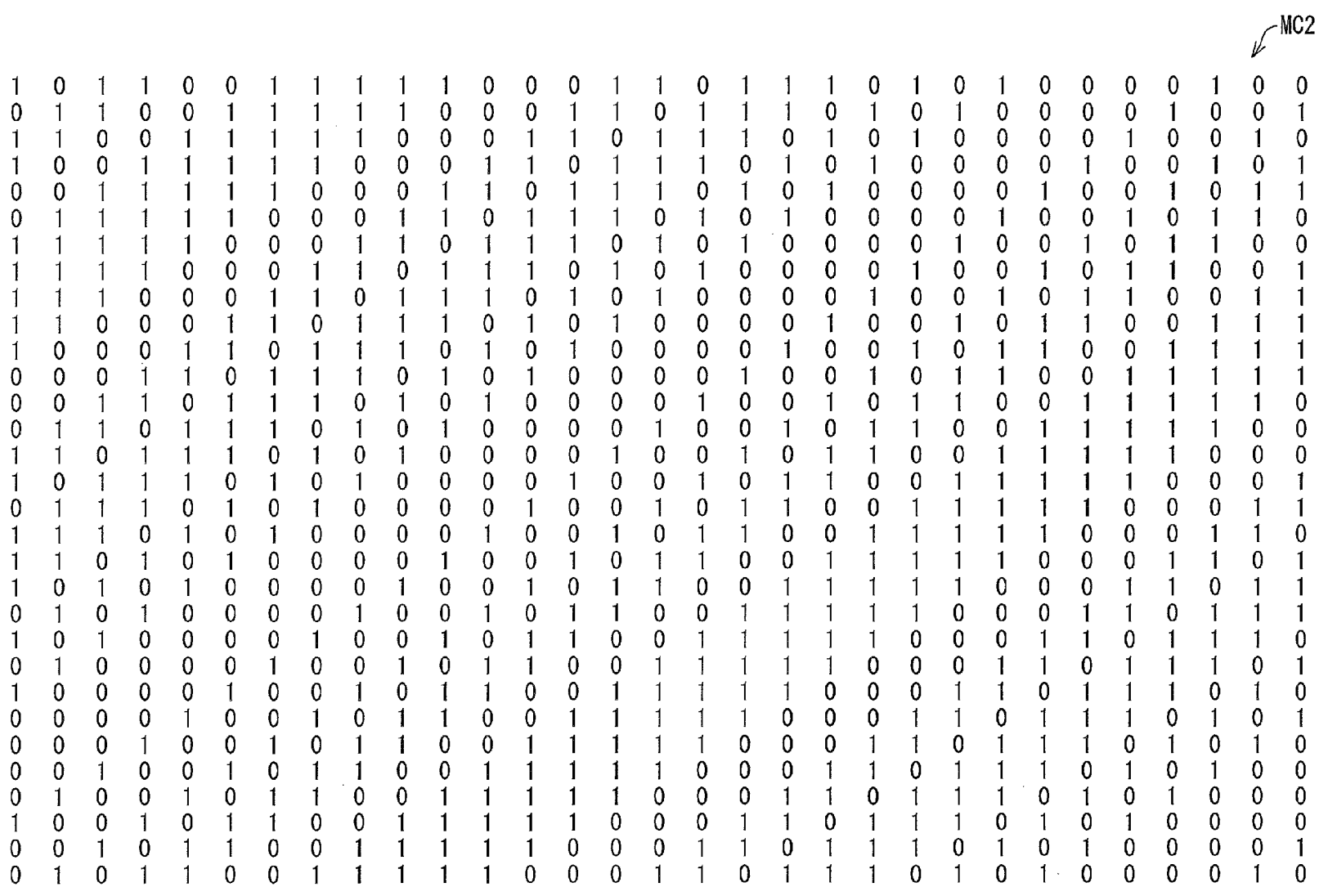
Figure 12:
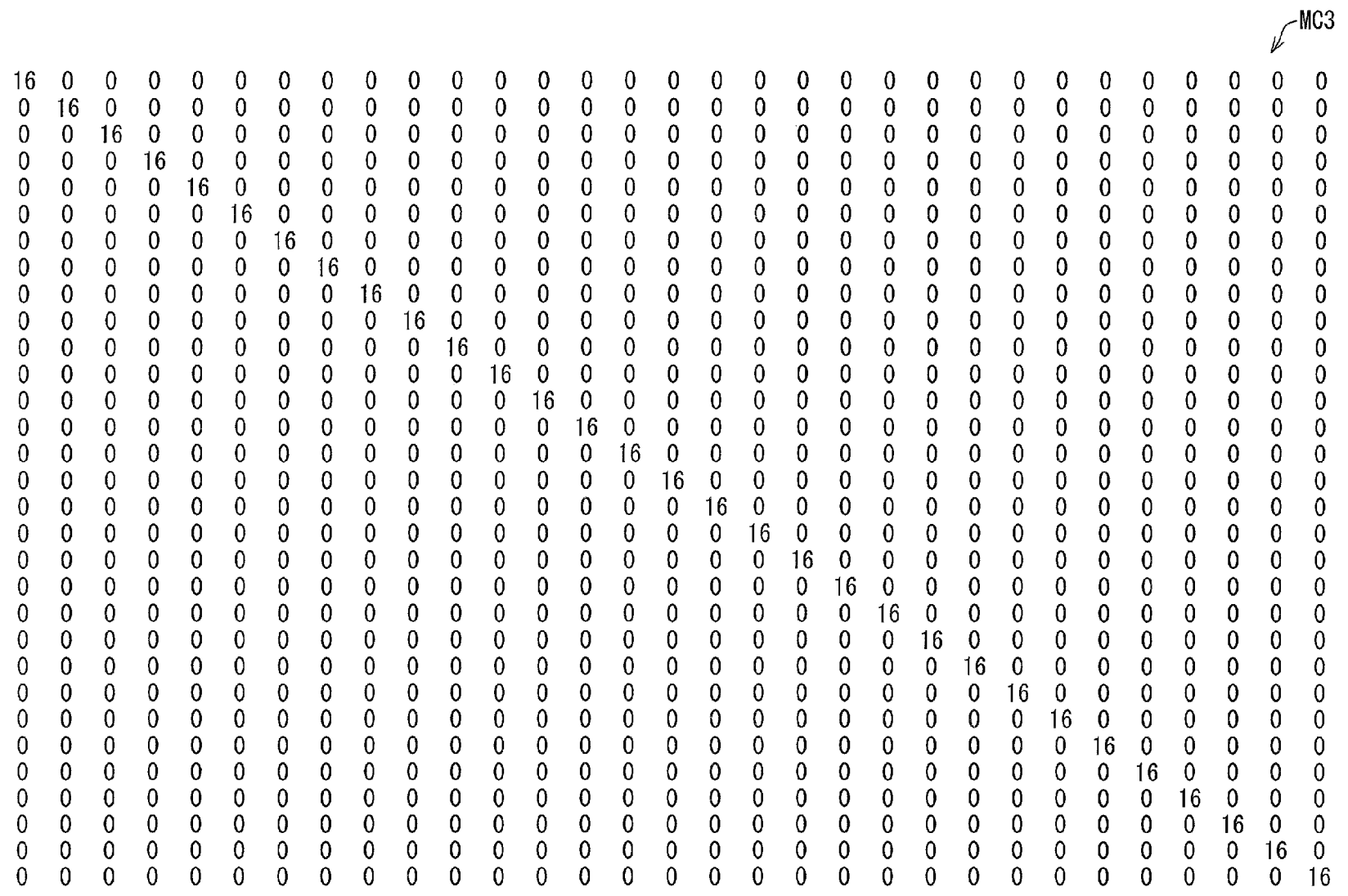

FIG. 10 is a diagram showing an M-sequence code MC1 on the basis of which the touch panel system 1 is driven. FIG. 11 is a diagram showing a decoding matrix MC2 for decoding in the case of driving based on the M-sequence code MC1. FIG. 12 is a diagram showing a matrix MC3 obtained as a result of calculation of the inner product of measured values and the decoding matrix MC2.

The M-sequence code MC1 is a 31×31 matrix, and 31 drive lines are driven 31 times by $1^{st}$ vector to $31^{st}$ vector on the basis of the M-sequence code MC1, so that 31 measured values Y1 to Y31 are obtained. The element "1" of the M-sequence code MC1 means the application of +V volts to the drive line, and the element "0", which is denoted as "−1" in FIG. 10, means the application of −V volts to the drive line.

The decoding matrix MC2 for decoding in the case of driving based on the M-sequence code MC1 is a 31×31 matrix, and the matrix MC3 shown in FIG. 12 is obtained by calculating the inner product of the measured values Y1 to Y31 and the decoding matrix MC2.

Of the measured values, sixteen items of data are used to estimate the capacitance. The signal component is sixteen times as large, and the noise component, if assumed to be uncorrelated, is four times as large. In a case where a Hadamard code that is an orthogonal code sequence is used, the signal component and the noise component correspond to those obtained by using sixteen vectors. Thus, in a case where an M-sequence code is used, the signal component and the noise component are the same as those obtained by using the sixteen vectors of the Hadamard code, even through the number of vectors is 31. Therefore, use of an orthogonal code sequence brings about an advantage of yielding a higher SN ratio than does use of an M-sequence code.

(Embodiment 2)
(Configuration of a Touch Panel System 1A)

Figure 13:
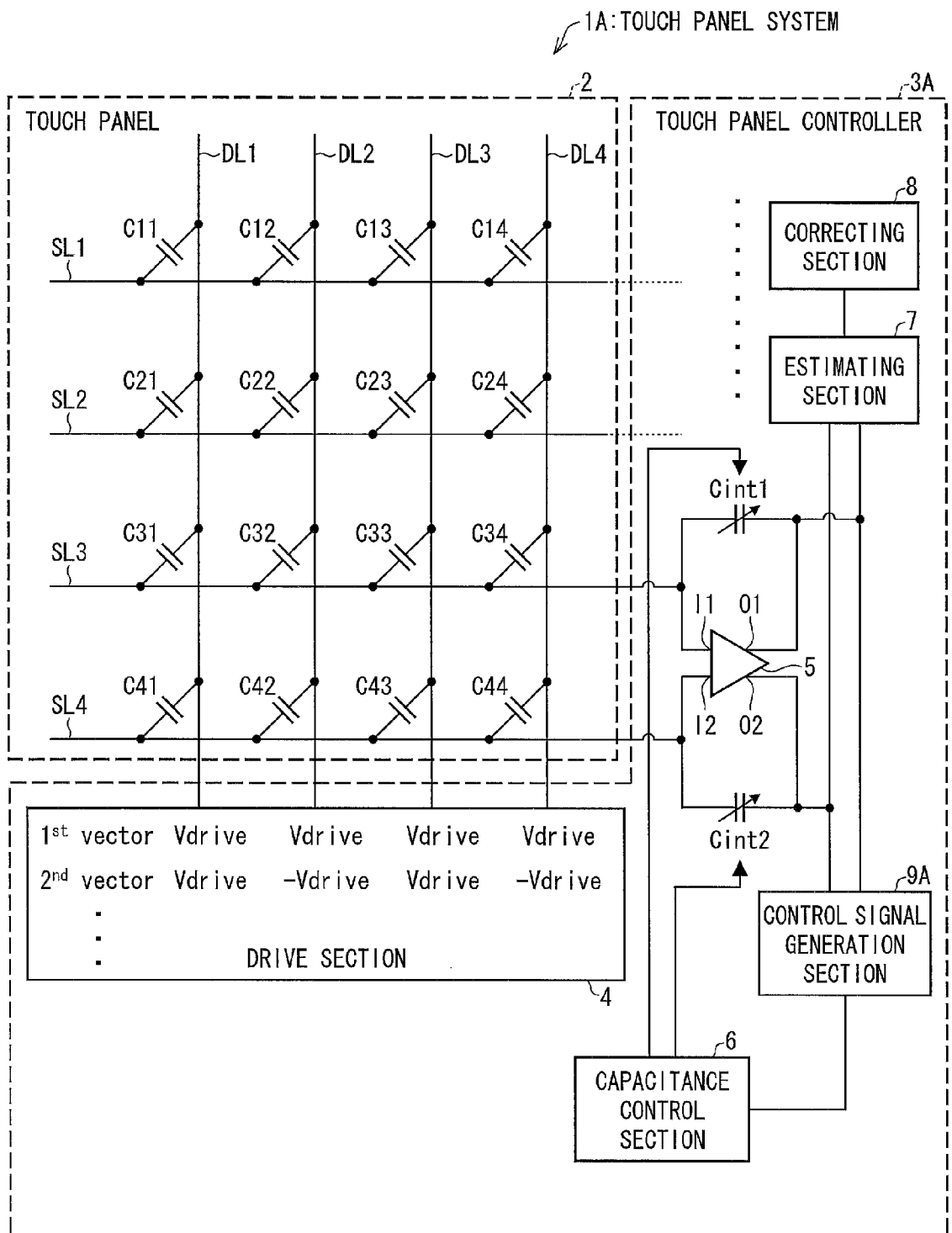
FIG. 13 is a schematic view showing a configuration of a touch panel system according to Embodiments 2 and 3.

FIG. 13 is a schematic view showing a configuration of a touch panel system 1A according to Embodiment 2. Those constituent elements which are the same as those described above with reference to FIG. 9 are given the same reference signs. These constituent elements are not repeatedly described in detail below.

The touch panel system 1A has a control signal generation section 9A, connected to the capacitance control section 6, which receives an output signal from the differential amplifier 5. In a period of absence of touch input to the touch panel system 1A, the control signal generation section 9A performs calibration for determining the capacitances of the variable integral capacitors $C_{int1}$ and $C_{int2}$.

That is, the control signal generation section 9A controls the value on at least either the integral capacitor $C_{int1}$ or $C_{int2}$ on the basis of the output signal from the differential amplifier 5. Then, in a period of absence of touch input to the capacitors, the control signal generation section 9A controls the value on at least either the integral capacitor $C_{int1}$ or $C_{int2}$ so that the output signal from the differential amplifier 5 comes close to zero.

(Operation of the Touch Panel System 1A)

During the calibration for determining the capacitances of the variable integral capacitors $C_{int1}$ and $C_{int2}$, first, the drive section 4 applies the signal Vdrive to all of the drive lines DL1 to DL4 in accordance with $1^{st}$ vector (first vector). Then, as described in Embodiment 1, the differential amplifier 5 outputs a signal that depends on the sense line dependency (difference in capacitance) ΔC. The control signal generation section 9A monitors the signal that depends on the sense line dependency (difference in capacitance) ΔC. Then, in the next step, the capacitance control section 6 changes the values on the integral capacitors $C_{int1}$ and $C_{int2}$ in accordance with the result of monitoring by control signal generation section 9A so that the output signal from the differential amplifier 5 becomes smaller.

In a case where the sense line dependency (difference in capacitance) ΔC described in Embodiment 1 is positive, the capacitance of the sense line SL3 tends to be larger than the capacitance of the sense line SL4. For this reason, the value on the integral capacitor $C_{int1}$ is made larger, or the value on the integral capacitor $C_{int2}$ is made smaller, or the value on the integral capacitor $C_{int1}$ is made larger and the value on the integral capacitor $C_{int2}$ is made smaller.

Next, the drive section 4 again applies the signal Vdrive to all of the drive lines DL1 to DL4, and changes the values on the integral capacitors $C_{int1}$ and $C_{int2}$ so that the output signal from the differential amplifier 5 becomes smaller.

The changes in the values on the integral capacitors $C_{int1}$ and $C_{int2}$ are repeated until the output signal from the differential amplifier 5 becomes zero or this output signal has its polarity reversed. In this way, the control signal generation section 9A controls the integral capacitances $C_{int1}$ and $C_{int2}$ in a period of absence to touch input during calibration so that the output signal from the differential amplifier 5 becomes zero, thereby making it possible to appropriately set the values on the integral capacitors $C_{int1}$ and $C_{int2}$. This makes it possible to prevent the differential amplifier 5 from being saturated due to a sense-line-dependent variation in capacitance.

(Embodiment 3)

Normally, input to the touch panel system is input by touch. It is thought that during this input by touch, the period of time during which the screen is being touched for input is far shorter than the period of time during which the screen is not touched.

If so, the operation of calibration by the control signal generation section 9A during calibration in the absence of touch input as described in Embodiment 2 can be configured to be performed not only during calibration in the absence of touch input but also during normal touch input to the touch panel, and saturation of the differential amplifier 5 can be suppressed even in a case where there is a change in variation in electrostatic capacitance due to ambient temperature or an environmental factor such as foreign matter having adhered to the screen.

In this case, errors in signal due to calibration can be reduced by setting the speed with which the control signal generation section 9A changes the values on the integral capacitors $C_{int1}$ and $C_{int2}$ to be sufficiently slower than the assumed period of touch. For example, assuming that the frequency at which the control signal generation section 9A updates the values on the integral capacitors $C_{int1}$ and $C_{int2}$ via the capacitance control section 6 is once per second, an error given, if any, is only as much as one step of the change in capacitance of the integral capacitors $C_{int1}$ and $C_{int2}$, provided that the length of time that a touch on the screen for input continues is within one second. If there is no touch input within the next one second, it is possible to correct the error.

The control signal generation section 9A according to Embodiment 3 controls the value on at least either the integral capacitor $C_{int1}$ or $C_{int2}$ at predetermined time intervals. Moreover, each of the time intervals at which the control signal generation section 9A controls the value on at least either the integral capacitor $C_{int1}$ or $C_{int2}$ is longer than the length of time that a touch on the screen for input continues.

(Embodiment 4)

(Configuration of a Touch Panel System 1B)

Figure 14:
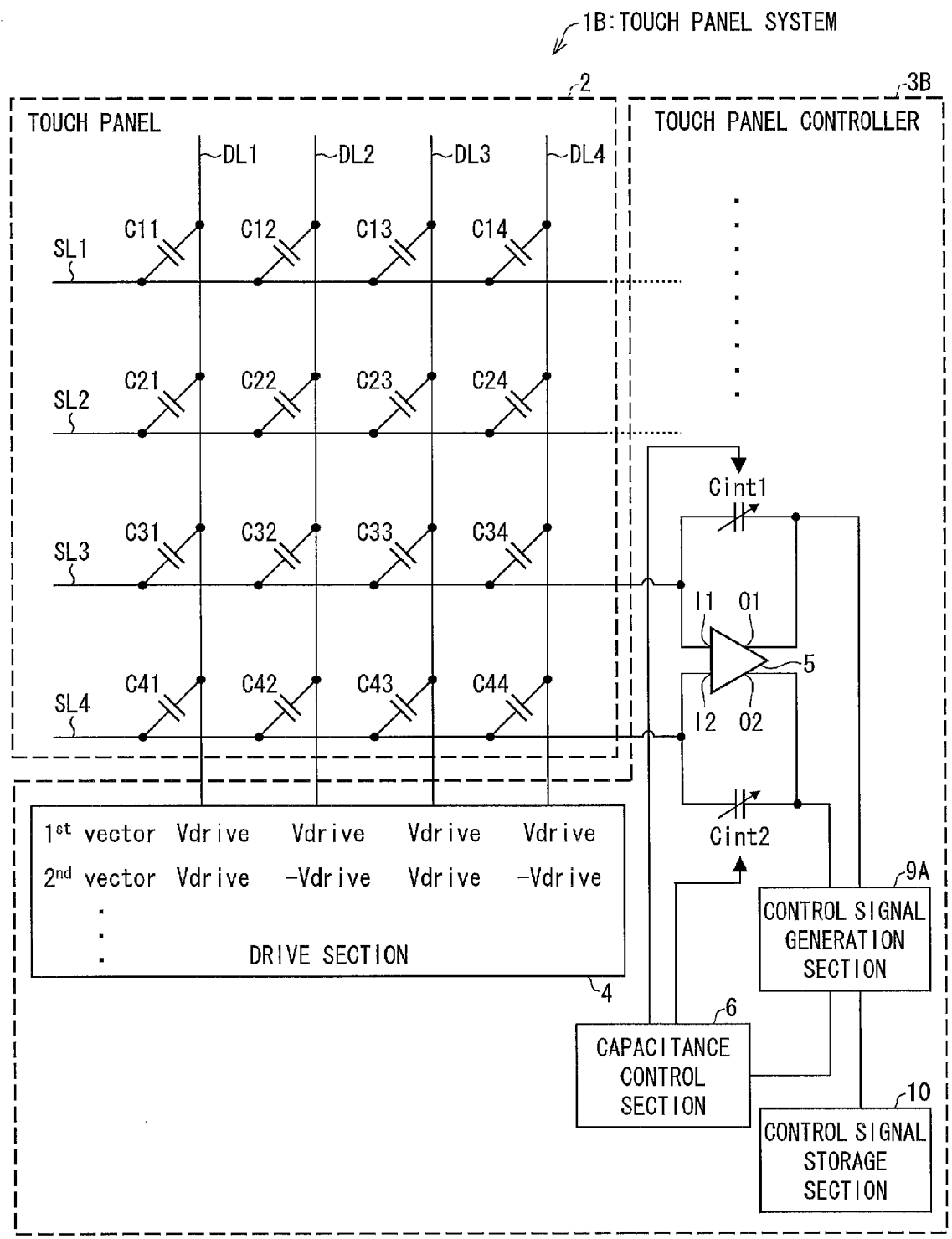
FIG. 14 is a schematic view showing a configuration of a touch panel system according to Embodiment 4.

FIG. 14 is a schematic view showing a configuration of a touch panel system 1B according to Embodiment 4. Those constituent elements which are the same as those described above with reference to FIG. 13 are given the same reference signs. These constituent elements are not repeatedly described in detail below.

The touch panel system 1A described in Embodiment 2 compensates for sense-line-dependent variations in electrostatic capacitance. However, since calibration is performed with all output signals from the drive section 4 being Vdrive, drive-line-dependent variations in electrostatic capacitance whose influence changes depending on the output signals from the drive section 4 cannot be compensated for.

The touch panel system 1B according to Embodiment 4 has a touch panel controller 3B. As with a touch panel controller 3A of the touch panel system 1A, the touch panel controller 3B has a control signal generation section 9A, connected to the capacitance control section 6, which receives an output signal from the differential amplifier 5. Moreover, the touch panel controller 3B has a control signal storage section 10 connected to the control signal generation section 9A.

(Operation of the Touch Panel System 1B)

In a period of absence of touch input to the touch panel system 1B, the control signal generation section 9A performs calibration for determining the capacitances of the variable capacitors $C_{int1}$ and $C_{int2}$. During this calibration, the drive section 4 outputs $1^{st}$ vector (first vector) shown in FIG. 14. As in the case introduced in Embodiment 2, the control signal generation section 9A updates the capacitances of the variable capacitors $C_{int1}$ and $C_{int2}$ until the output signal from the differential amplifier 5 becomes zero or the output signal has its polarity reversed.

Once the capacitances of the variable capacitors $C_{int1}$ and $C_{int2}$ are determined, the value of the control signal of that time as generated by the control signal generation section 9A is stored in the control signal storage section 10. Next, the drive section 4 outputs $2^{nd}$ vector (second vector) shown in FIG. 14, and the differential amplifier 5 and the control signal generation section 9A operate in a similar manner. The control signal generation section 9A stores the value of a generated control signal in the control signal storage section 10. Moreover, the the control signal generation section 9A generates control signals for all of the vectors that are used, and stores the control signals in the control signal storage section 10.

A control signal thus stored in the control signal storage section 10 is invoked in accordance with the vector that is to be used, and the capacitances of the variable capacitors $C_{int1}$ and $C_{int2}$ are updated on the basis of the control signal thus invoked. This makes it possible to compensate for drive-line-dependent variations in electrostatic capacitance.

Thus, during calibration operation, the control signal generation section 9A generates (i) a first control signal for controlling the value on at least either the variable capacitor $C_{int1}$ or $C_{int2}$ so that an output signal from the differential amplifier 5 which corresponds to driving based on $1^{st}$ vector (first vector) comes close to zero and (ii) a second control signal for controlling the value on at least either the variable capacitor $C_{int1}$ or $C_{int2}$ so that an output signal from the differential amplifier 5 which corresponds to driving based on $2^{nd}$ vector (second vector) comes close to zero.

Then, the control signal storage section 10 stores therein the control signals (first control signal, second control signal) generated by the control signal generation section 9A. When the drive lines DL1 to DL4 have been driven in accordance with $1^{st}$ vector (first vector), the capacitor control section 6 controls the value on at least either the variable capacitor $C_{int1}$ or $C_{int2}$ on the basis of the first control signal stored in the control signal storage section 10, and when the drive lines DL1 to DL4 have been driven in accordance with $2^{nd}$ vector (second vector), the capacitor control section 6 controls the value on at least either the variable capacitor $C_{int1}$ or $C_{int2}$ on the basis of the second control signal stored in the control signal storage section 10.

(Embodiment 5)

A portable phone 300, i.e. an example of an electronic device mounted with a touch panel that is controlled by an integrated circuit of the present invention, is described with reference to FIG. 15.

Figure 15:
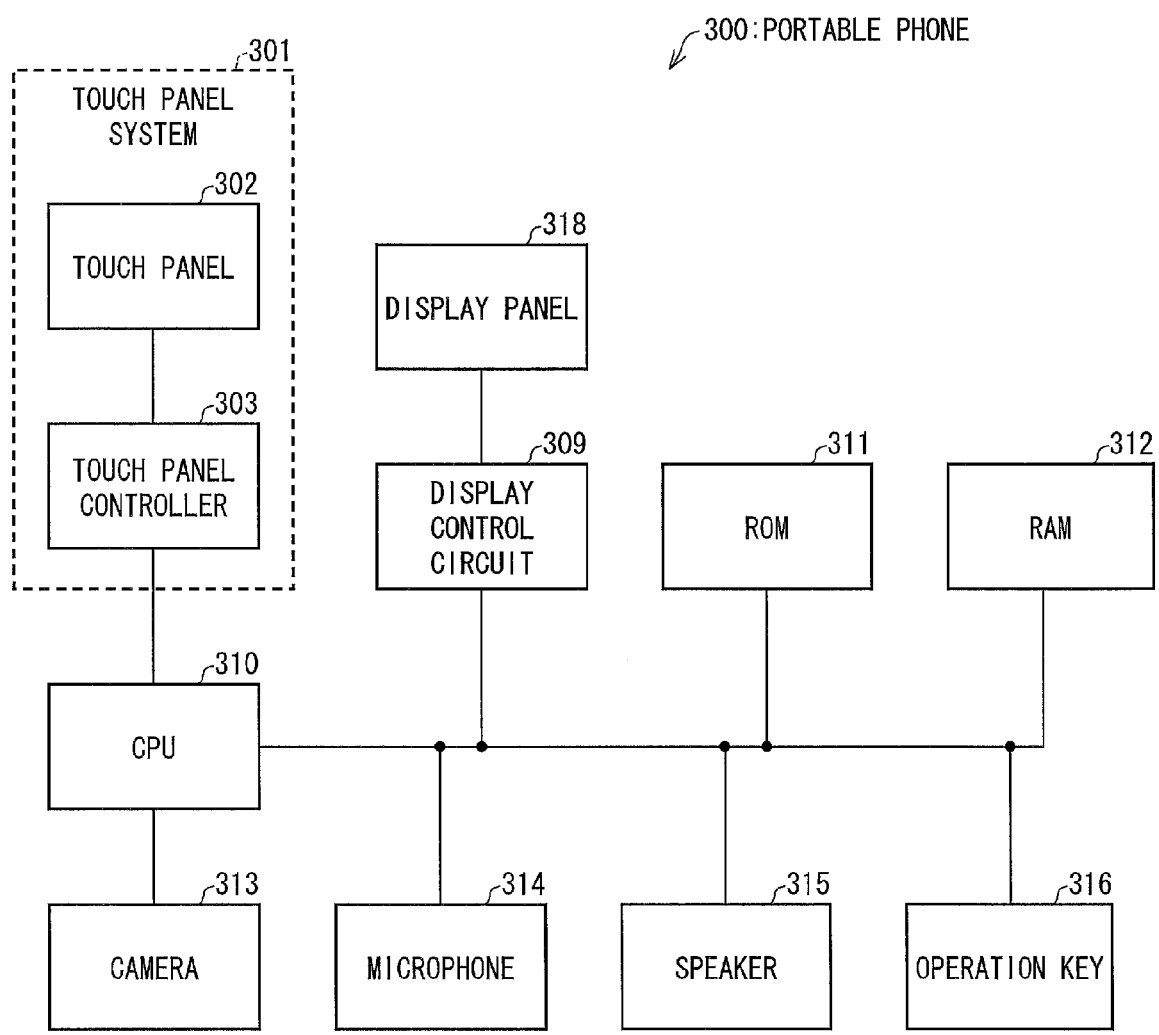
FIG. 15 is a block diagram showing a configuration of an electronic device according to Embodiment 5.
Figure 16:
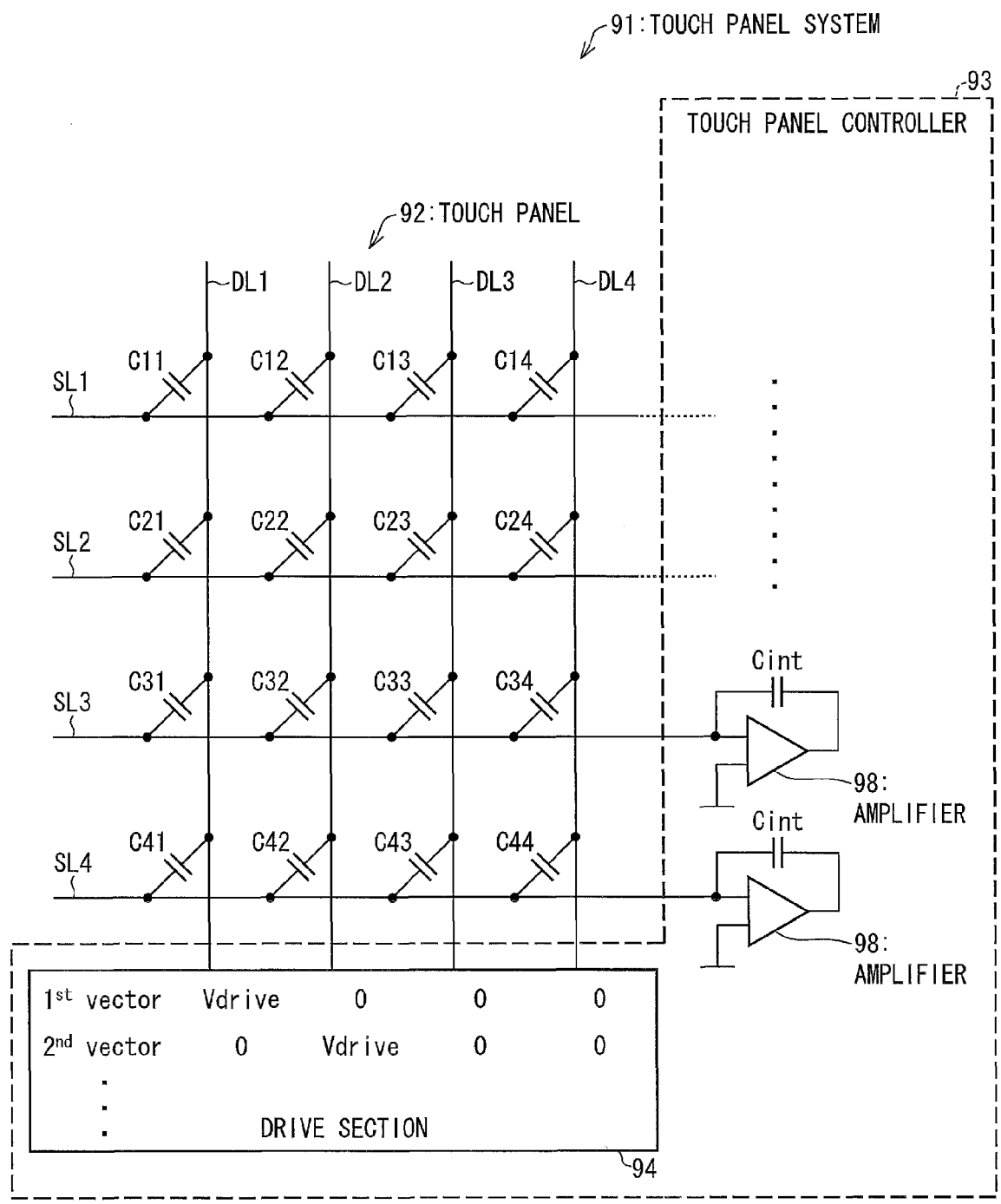
FIG. 16 is a schematic view showing a configuration of a conventional touch panel.

FIG. 15 is a block diagram showing a configuration of the portable phone 300 according to Embodiment 5. The portable phone 300 includes a CPU 310, RAM 312, ROM 311, a camera 313, a microphone 314, a speaker 315, an operation key 316, a display panel 318, a display control circuit 309, and a touch panel system 301. These constituent elements are connected to one another via data buses.

The CPU 310 controls how the portable phone 300 operates. The CPU 310 executes a program stored, for example, in the ROM 311. The operation key 316 accepts an instruction from a user to the portable phone 300. The RAM 312 acts as a volatile storage for data generated by the execution of the program by the CPU 310 or data inputted via the operation key 316. The ROM 311 acts as a non-volatile storage for data.

Further, the ROM 311 is a writable and erasable ROM such as EPROM (erasable programmable read-only memory) or a flush memory. Further, although not shown in FIG. 15, the portable phone 300 may include an interface (IF) via which the portable phone 300 is connected to another electronic device in a wired manner.

The camera 313 takes an image of a subject in accordance with operation of the operation key 316 by the user. Data representing the image taken of the subject is stored in the RAM 321 or an external memory (e.g. a memory card). The microphone 314 accepts input of sound of the user. The portable phone 300 digitalizes the sound (analog data) thus inputted. Then, the portable phone 300 sends the sound thus digitalized to a communication partner (e.g. another portable phone). The speaker 315, for example, outputs sound based on music data stored in the RAM 312.

The touch panel system 301 has a touch panel 302 and a touch panel controller 303 (integrated circuit). The CPU 310 controls how the touch panel system 301 operates. The CPU 310 executes a program stored, for example, in the ROM 311. The RAM 312 acts as a volatile storage for data generated by the execution of the program by the CPU 310. The ROM 311 acts as a non-volatile storage for data.

The display panel 318 is caused by the display control circuit 309 to display an image stored in the ROM 311 or the RAM 312. The display panel 318 may be joined on top of the touch panel 302, or may contain the touch panel 302.

(Aspects of the Present Invention)

In order to attain the foregoing object, a touch panel controller according to the present invention includes: a drive section which drives M drive lines for (i) a plurality of first capacitors respectively formed between M drive lines and a first sense line and (ii) a plurality of second capacitors respectively formed between the M drive lines and a second sense line that is adjacent to the first sense line, and which thereby causes a first linear sum output from the plurality of first capacitors to be outputted from the first sense line and causes a second linear sum output from the plurality of second capacitors to be outputted from the second sense line; and a differential amplifier which amplifies the difference between the first linear sum output and the second linear sum output, the differential amplifier having a non-inverting input terminal via which the differential amplifier receives the first linear sum output, a first output terminal corresponding to the non-inverting input terminal, an inverting input terminal via which the differential amplifier receives the second linear sum output, a second output terminal corresponding to the inverting input terminal, the touch panel controller further including: a first variable integral capacitor coupled to the non-inverting input terminal and to the first output terminal; a second variable integral capacitor coupled to the inverting input terminal and to the second output terminal; and control means which controls the value on at least either the first variable integral capacitor or the second variable integral capacitor so as to correct line dependency of the first and second capacitors.

As used herein, the term "line dependency" is intended to refer to a phenomenon in which the capacitances of capacitors formed between drive lines and sense lines and the capacitances of parasitic components including wires tend to be different values depending on the sense lines or the drive line due to the influence of manufacturing processes, although manufacturing is done with the aim of the capacitances becoming equal to each other.

According to the foregoing feature, the value on at least either (i) the first variable integral capacitor coupled to the non-inverting input terminal of the differential amplifier which amplifies the difference between the first linear sum output and the second linear sum output and to the first output terminal of the differential amplifier or (ii) the second variable integral capacitor coupled to the inverting input terminal of the differential amplifier and to the second output terminal of the differential amplifier is controlled so that the line dependency of the first and second capacitors is corrected. For this reason, the line dependency of the capacitances of the first and second electrostatic capacitances are corrected; therefore, a touch panel controller can be provided which is capable of correctly detecting a change in capacitance of any of the first and second capacitors that has been touched, even when the first and second capacitors are those manufactured to have different values depending on the lines due to the influence of manufacturing processes.

The touch panel controller according to the present invention is preferably configured such that the drive section drives the M drive lines on the basis of a predetermined code sequence, the touch panel controller further including: estimating means which estimates the values on the plurality of first capacitors and on the plurality of second capacitors by calculating the inner product of the difference between the first linear sum output and the second linear sum output as amplified by the differential amplifier and the code sequence; and correcting means which, in accordance with the values on the second variable integral capacitor as controlled by the control means, corrects the values on the plurality of second capacitors as estimated by the estimating means.

With the foregoing configuration, the values on the plurality of second capacitors as estimated by the estimating means are corrected on the basis of the value on the second variable integral capacitor as controlled by the control means; therefore, errors due to an operation of correcting the line dependency of the capacitances of the first and second electrostatic capacitances can be reduced, and a touch panel controller can be provided which is capable of correctly detecting a change in capacitance of any of the first and second capacitors that has been touched, even when the first and second capacitors are those manufactured to have different values depending on the lines due to the influence of manufacturing processes.

The touch panel controller according to the present invention is preferably configured such that the correcting means corrects the values on the second capacitors so as to cancel out a change in the value on the second variable integral capacitor as controlled by the controlling means.

With the foregoing configuration, the values on the second capacitors are corrected so that a change in the value on the second variable integral capacitor as controlled by the controlling means is canceled out; therefore, errors due to an operation of correcting the line dependency of the capacitances of the first and second capacitors can be reduced.

The touch panel controller according to the present invention is preferably configured to further include calibration means which controls the value on at least either the first variable integral capacitor or the second variable integral capacitor on the basis of an output signal from the differential amplifier.

With the foregoing configuration, even in a case where there are individual differences among touch panels, M drive lines are driven on the basis of a code sequence of a length N ($N \geq M$) for (i) a plurality of first capacitors respectively formed between M drive lines and a first sense line and (ii) a plurality of second capacitors respectively formed between the M drive lines and a second sense line that is adjacent to the first sense line, whereby a first linear sum output from the plurality of first capacitors is caused to be outputted from the first sense line and a second linear sum output from the plurality of second capacitors is caused to be outputted from the second sense line, and in amplifying the difference between the first linear sum output and the second linear sum output, the line dependency of the capacitances of the first and second capacitors are corrected; therefore, a change in capacitance of any of the first and second capacitors that has been touched can be correctly detected even when the first and second capacitors are those manufactured to have different values depending on the lines due to the influence of manufacturing processes.

The touch panel controller according to the present invention is preferably configured such that in a period of absence of touch input to the first and second capacitors, the calibration means controls the value on at least either the first variable integral capacitor or the second variable integral capacitor so that the output signal from the differential amplifier comes close to zero.

With the foregoing configuration, without influence being exerted by operation of the calibration section during normal operations, M drive lines are driven on the basis of a code sequence of a length N (N≥M) for (i) a plurality of first capacitors respectively formed between M drive lines and a first sense line and (ii) a plurality of second capacitors respectively formed between the M drive lines and a second sense line that is adjacent to the first sense line, whereby a first linear sum output from the plurality of first capacitors is caused to be outputted from the first sense line and a second linear sum output from the plurality of second capacitors is caused to be outputted from the second sense line, and in amplifying the difference between the first linear sum output and the second linear sum output, the line dependency of the capacitances of the first and second capacitors are corrected; therefore, a touch panel controller can be provided which is capable of correctly detecting a change in capacitance of any of the first and second capacitors that has been touched, even when the first and second capacitors are those manufactured to have different values depending on the lines due to the influence of manufacturing processes.

The touch panel controller according to the present invention is preferably configured such that the calibration means controls the value on at least either the first variable integral capacitor or the second variable integral capacitor at predetermined time intervals; and each of the time intervals at which the calibration means controls the value on at least either the first variable integral capacitor or the second variable integral capacitor is longer than a length of time that touch input to the first and second capacitors continues.

With the foregoing configuration, without much influence exerted even in a case where there is a change in capacitance of the panel due to temperature or foreign matter adhering to the panel, M drive lines are driven on the basis of a code sequence of a length N (N≥M) for (i) a plurality of first capacitors respectively formed between M drive lines and a first sense line and (ii) a plurality of second capacitors respectively formed between the M drive lines and a second sense line that is adjacent to the first sense line, whereby a first linear sum output from the plurality of first capacitors is caused to be outputted from the first sense line and a second linear sum output from the plurality of second capacitors is caused to be outputted from the second sense line, and in amplifying the difference between the first linear sum output and the second linear sum output, the line dependency of the capacitances of the first and second capacitors are corrected; therefore, a touch panel controller can be provided which is capable of correctly detecting a change in capacitance of any of the first and second capacitors that has been touched, even when the first and second capacitors are those manufactured to have different values depending on the lines due to the influence of manufacturing processes.

Further, since each of the time intervals at which the calibration means controls the value on at least either the first variable integral capacitor or the second variable integral capacitor is longer than a length of time that touch input to the first and second capacitors continues, an error due to the touch input can be corrected by the next control of the calibration means after the touch input.

The touch panel controller according to the present invention is preferably configured such that: the drive section drives on the basis of a code sequence including a first vector and a second vector; and during calibration operation, the calibration means generates (i) a first control signal for controlling the value on at least either the first variable integral capacitor or the second variable integral capacitor so that an output signal from the differential amplifier which corresponds to driving based on the first vector comes close to zero and (ii) a second control signal for controlling the value on at least either the first variable integral capacitor or the second variable integral capacitor so that an output signal from the differential amplifier which corresponds to driving based on the second vector comes close to zero; the touch panel controller further including storage means in which to store the first control signal and the second control signal generated by the calibration means, when the drive lines have been driven in accordance with the first vector, the control means controlling the value on at least either the first variable integral capacitor or the second variable integral capacitor on the basis of the first control signal stored in the storage means, when the drive lines have been driven in accordance with the second vector, the control means controlling the value on at least either the first variable integral capacitor or the second variable integral capacitor on the basis of the second control signal stored in the storage means.

With the foregoing configuration, either of the first and second control signals thus stored in the storage means is invoked in accordance with the vector that is to be used, and the value on at least either the first variable integral capacitor or the second variable integral capacitor is updated on the basis of the first or second control signal thus invoked. This makes it possible to compensate for drive-line-dependent variations in capacitance.

An integrated circuit according to the present invention includes a touch panel controller according to the present invention integrated therewith.

A touch panel system according to the present invention includes a touch panel controller according to the present invention mounted therein.

An electronic device according to the present invention includes a touch panel controller according to the present invention mounted therein.

The present invention is not limited to the description of the embodiments above, but may be altered by a skilled person within the scope of the claims. An embodiment based on a proper combination of technical means disclosed in different embodiments is encompassed in the technical scope of the present invention.

Industrial Applicability

The present invention is applicable to a touch panel controller that drives a plurality of drive lines in parallel with each other and thereby estimates or detects the capacitances of capacitors arranged in a matrix manner, an integrated circuit using the same, a touch panel system using the same, and an electronic device using the same.

REFERENCE SIGNS LIST

1 Touch panel system
2 Touch panel
3 Touch panel controller

4 Drive section
5 Differential amplifier
6 Capacitance control section (control means)
7 Estimating section (estimating means)
8 Correcting section (correcting means)
9A Control signal generating section (calibration means)
10 Control signal storage section
DL1 to DL4 Drive line
SL1 to SL4 Sense line
C11 to C44 Capacitor
I1 Non-inverting input terminal
I2 Inverting input terminal
O1 Output terminal (first output terminal)
O2 Output terminal (second output terminal)
Cint1 Integral capacitor (first variable integral capacitor)
Cint2 Integral capacitor (second variable integral capacitor)

The invention claimed is:

1. A touch panel controller comprising:
a drive section which drives M drive lines for (i) a plurality of first capacitors respectively formed between M drive lines and a first sense line and (ii) a plurality of second capacitors respectively formed between the M drive lines and a second sense line that is adjacent to the first sense line, and which thereby causes a first linear sum output from the plurality of first capacitors to be outputted from the first sense line and causes a second linear sum output from the plurality of second capacitors to be outputted from the second sense line; and
a differential amplifier which amplifies the difference between the first linear sum output and the second linear sum output,
the differential amplifier having a non-inverting input terminal via which the differential amplifier receives the first linear sum output, a first output terminal corresponding to the non-inverting input terminal, an inverting input terminal via which the differential amplifier receives the second linear sum output, a second output terminal corresponding to the inverting input terminal,
the touch panel controller further comprising:
a first variable integral capacitor coupled to the non-inverting input terminal and to the first output terminal;
a second variable integral capacitor coupled to the inverting input terminal and to the second output terminal; and
control means which controls the value on at least either the first variable integral capacitor or the second variable integral capacitor so as to correct line dependency of the first and second capacitors.

2. The touch panel controller as set forth in claim 1, wherein the drive section drives the M drive lines on the basis of a predetermined code sequence,
the touch panel controller further comprising:
estimating means which estimates the values on the plurality of first capacitors and on the plurality of second capacitors by calculating the inner product of the difference between the first linear sum output and the second linear sum output as amplified by the differential amplifier and the code sequence; and
correcting means which, in accordance with the values on the second variable integral capacitor as controlled by the control means, corrects the values on the plurality of second capacitors as estimated by the estimating means.

3. The touch panel controller as set forth in claim 2, wherein the correcting means corrects the values on the second capacitors so as to cancel out a change in the value on the second variable integral capacitor as controlled by the controlling means.

4. The touch panel controller as set forth in claim 1, further comprising calibration means which controls the value on at least either the first variable integral capacitor or the second variable integral capacitor on the basis of an output signal from the differential amplifier.

5. The touch panel controller as set forth in claim 4, wherein in a period of absence of touch input to the first and second capacitors, the calibration means controls the value on at least either the first variable integral capacitor or the second variable integral capacitor so that the output signal from the differential amplifier comes close to zero.

6. The touch panel controller as set forth in claim 4, wherein:
the calibration means controls the value on at least either the first variable integral capacitor or the second variable integral capacitor at predetermined time intervals; and
each of the time intervals at which the calibration means controls the value on at least either the first variable integral capacitor or the second variable integral capacitor is longer than a length of time that touch input to the first and second capacitors continues.

7. The touch panel controller as set forth in claim 4, wherein:
the drive section drives on the basis of a code sequence including a first vector and a second vector; and
during calibration operation, the calibration means generates (i) a first control signal for controlling the value on at least either the first variable integral capacitor or the second variable integral capacitor so that an output signal from the differential amplifier which corresponds to driving based on the first vector comes close to zero and (ii) a second control signal for controlling the value on at least either the first variable integral capacitor or the second variable integral capacitor so that an output signal from the differential amplifier which corresponds to driving based on the second vector comes close to zero;
the touch panel controller further comprising storage means in which to store the first control signal and the second control signal generated by the calibration means,
when the drive lines have been driven in accordance with the first vector, the control means controlling the value on at least either the first variable integral capacitor or the second variable integral capacitor on the basis of the first control signal stored in the storage means, when the drive lines have been driven in accordance with the second vector, the control means controlling the value on at least either the first variable integral capacitor or the second variable integral capacitor on the basis of the second control signal stored in the storage means.

8. An integrated circuit comprising a touch panel controller as set forth in claim 1 integrated therewith.

9. A touch panel system comprising a touch panel controller as set forth in claim 1 mounted therein.

10. An electronic device comprising a touch panel controller as set forth in claim 1 mounted therein.

* * * * *